(12) United States Patent
Wittstock et al.

(10) Patent No.: US 12,056,474 B2
(45) Date of Patent: Aug. 6, 2024

(54) IN-APPLICATION USER INTERFACE MESSAGING

(71) Applicant: Airship Group, Inc., Portland, OR (US)

(72) Inventors: Nathan Mark Wittstock, Portland, OR (US); Ryan Lepinski, Portland, OR (US); Michael James Herrick, Portland, OR (US)

(73) Assignee: Airship Group, Inc., Portland, OR (US)

( * ) Notice: Subject to any disclaimer, the term of this patent is extended or adjusted under 35 U.S.C. 154(b) by 1 day.

(21) Appl. No.: 17/881,422

(22) Filed: Aug. 4, 2022

(65) Prior Publication Data
US 2023/0041924 A1    Feb. 9, 2023

Related U.S. Application Data

(60) Provisional application No. 63/230,670, filed on Aug. 6, 2021.

(51) Int. Cl.
*G06F 8/38* (2018.01)
*H04L 51/214* (2022.01)

(52) U.S. Cl.
CPC .............. *G06F 8/38* (2013.01); *H04L 51/214* (2022.05)

(58) Field of Classification Search
CPC ......... G06F 8/38; G06F 16/972; H04L 51/214
See application file for complete search history.

(56) References Cited

U.S. PATENT DOCUMENTS

| 5,873,106 A | 2/1999 | Joseph |
| 6,230,309 B1 | 5/2001 | Turner et al. |
| 6,732,120 B1 | 5/2004 | Du |

(Continued)

FOREIGN PATENT DOCUMENTS

KR    10-2017-0006813 A    1/2017

OTHER PUBLICATIONS

Boltclock, "Revision—Stack Overflow," https://stackoverflow.com/revisions/8426901/2, 1 page, Dec. 8, 2011.

(Continued)

*Primary Examiner* — Rami R Okasha
(74) *Attorney, Agent, or Firm* — Fenwick & West LLP

(57) ABSTRACT

A server may receive from a software development kit (SDK) a channel identifier that represents an in-application communication channel of a software application that imports the SDK as part of the software application. In some cases, the software application is developed by a message publisher and the SDK is developed by the message management server. The server receives configuration data describing an in-application user interface (UI) element for display by the software application, the configuration data including a trigger condition for displaying the in-application UI element. The server transmits a message to the SDK via the in-application communication channel. The message includes the trigger condition from the configuration data for the in-application UI element. In response to the SDK determining that the trigger condition is satisfied, the server provides additional configuration data from the configuration data for the in-application UI element to the SDK.

20 Claims, 13 Drawing Sheets

(56) References Cited

U.S. PATENT DOCUMENTS

| | | |
|---|---|---|
| 7,743,064 B2 | 6/2010 | Faulkner et al. |
| 7,925,982 B2 | 4/2011 | Parker et al. |
| 8,065,600 B2 | 11/2011 | Chorv et al. |
| 8,607,154 B2 | 12/2013 | Watts et al. |
| 8,761,797 B1 | 6/2014 | Norton |
| 8,909,771 B2 | 12/2014 | Heath |
| 9,081,855 B1 | 7/2015 | Abeloe et al. |
| 9,553,838 B1 | 1/2017 | Panchenko et al. |
| 10,338,898 B2* | 7/2019 | Savliwala .............. H04L 63/101 |
| 10,732,782 B1 | 8/2020 | Krivopaltsev et al. |
| 2002/0156618 A1 | 10/2002 | Mathur et al. |
| 2002/0188669 A1 | 12/2002 | Levine |
| 2003/0148771 A1 | 8/2003 | de Verteuil |
| 2004/0183838 A1 | 9/2004 | Lahiri |
| 2004/0257259 A1 | 12/2004 | Jindal |
| 2005/0197121 A1 | 9/2005 | Fujiwara et al. |
| 2005/0246373 A1 | 11/2005 | Faulkner et al. |
| 2005/0268080 A1 | 12/2005 | Quang et al. |
| 2006/0025161 A1 | 2/2006 | Funato et al. |
| 2006/0284878 A1 | 12/2006 | Zimmer |
| 2006/0294199 A1 | 12/2006 | Bertholf |
| 2008/0010262 A1 | 1/2008 | Frank |
| 2008/0059889 A1 | 3/2008 | Parker et al. |
| 2008/0108370 A1 | 5/2008 | Aninye |
| 2008/0133336 A1 | 6/2008 | Altman et al. |
| 2008/0174570 A1 | 7/2008 | Jobs et al. |
| 2008/0208620 A1 | 8/2008 | Karkanias et al. |
| 2008/0222283 A1 | 9/2008 | Ertugrul et al. |
| 2009/0228464 A1 | 9/2009 | Jones et al. |
| 2009/0265220 A1 | 10/2009 | Bayraktar et al. |
| 2009/0265345 A1 | 10/2009 | Carroll |
| 2010/0287566 A1 | 11/2010 | Hauser |
| 2010/0325194 A1 | 12/2010 | Williamson et al. |
| 2011/0154287 A1 | 6/2011 | Mukkamala et al. |
| 2011/0161328 A1 | 6/2011 | Park et al. |
| 2011/0238608 A1 | 9/2011 | Sathish |
| 2011/0258049 A1 | 10/2011 | Ramer et al. |
| 2011/0264996 A1 | 10/2011 | Norris |
| 2011/0289513 A1 | 11/2011 | Degirmenci et al. |
| 2012/0227000 A1 | 9/2012 | McCov et al. |
| 2012/0317205 A1 | 12/2012 | Lahiani et al. |
| 2013/0014046 A1 | 1/2013 | Watts et al. |
| 2013/0019182 A1 | 1/2013 | Gil et al. |
| 2013/0054706 A1 | 2/2013 | Graham et al. |
| 2013/0073336 A1 | 3/2013 | Heath |
| 2013/0212487 A1 | 8/2013 | Cote |
| 2013/0219307 A1* | 8/2013 | Raber ..................... G06F 8/355 715/763 |
| 2013/0324098 A1 | 12/2013 | Piemonte et al. |
| 2014/0047344 A1 | 2/2014 | Watts et al. |
| 2014/0100669 A1 | 4/2014 | Hammack et al. |
| 2014/0109176 A1* | 4/2014 | Barton .................... H04L 67/34 726/1 |
| 2014/0282218 A1 | 9/2014 | Kaufman et al. |
| 2014/0297175 A1 | 10/2014 | Zarem et al. |
| 2015/0160931 A1 | 6/2015 | Glazer et al. |
| 2015/0161088 A1 | 6/2015 | Kamada |
| 2017/0052835 A1 | 2/2017 | Cook et al. |
| 2018/0004507 A1* | 1/2018 | Aijaz ................... G06F 9/44505 |
| 2018/0314513 A1* | 11/2018 | DiTullio ............. G06F 16/9566 |
| 2019/0312746 A1* | 10/2019 | Myers, III .......... H04L 12/2807 |
| 2020/0153821 A1* | 5/2020 | Cao ...................... H04L 63/0861 |
| 2021/0096826 A1* | 4/2021 | Duggal .............. G06Q 30/0283 |
| 2021/0281654 A1 | 9/2021 | Howett et al. |
| 2022/0051221 A1* | 2/2022 | Pandey ................ G06Q 20/322 |

OTHER PUBLICATIONS

European Patent Office, Extended European Search Report and Opinion, EP Patent Application No. 20162248.7, dated Jun. 25, 2020, nine pages.

Extended European Search Report, European Application No. 15739969.2, dated Aug. 30, 2017, 12 pages.

Leiva, L., "ACE: An Adaptive CSS Engine for Web Pages and Web-based Applications," WWW2012 Developer Track, Apr. 2012, pp. 1-4.

Leiva, L., "Interaction-based user interface redesign," Proceedings of the 2012 ACM International Conference on Intelligent User Interfaces, Feb. 2012, pp. 311-312.

PCT International Search Report and Written Opinion, PCT Application No. PCT/US15/11986, dated Apr. 9, 2015, 9 pages.

United States Office Action, U.S. Appl. No. 14/506,990, dated Jan. 12, 2017, 24 pages.

United States Office Action, U.S. Appl. No. 14/506,990, dated Jun. 15, 2018, 12 pages.

United States Office Action, U.S. Appl. No. 14/506,990, dated Nov. 16, 2017, 22 pages.

United States Office Action, U.S. Appl. No. 16/381,590, filed Aug. 20, 2020, 11 pages.

W3C, "Selectors API Level 1," Feb. 21, 2013, eight pages, [Online] [Retrieved on Jun. 12, 2020] Retrieved on the Internet <URL: https://www.w3.org/TR/selectors-api/>.

W3SCHOOLS, "CSS Selector Reference," https://www.w3schools.com/cssref/css_selectors.asp, 9 pages, Jan. 1, 2014.

PCT International Search Report and Written Opinion, PCT Application No. PCT/IB2022/057286, Nov. 3, 2022, 9 pages.

\* cited by examiner

● Settings ｜ ○ Target ｜ ○ Content ｜ ○ Trigger          Target

Cancel tour creation

Start Date
Specify a day and time this app tour begins.

End date
Specify a day and time this app tour is completed.

Repeat this message
Configure the maximum number of times a tour may be displayed and the minimum waiting period before it is eligible for redisplay.

Choose message priority
Assign a message priority to ensure that your audience sees the highest priority messages first.

Campaign Categories
Group messages of a similar type or messaging strategy for aggregate reporting.

Set a tag
Set a tag when the tour is displayed.

○ Settings  ○ Target  ○ Content  ● Trigger

◀ Content                                                    Review and Finish

What will trigger this in-app tour?

Trigger Events

App Open
Display when the app is opened.

Display when the app is opened [ 1 ] times.        ●
                                                   ○

+ Add Another

Display only if the following conditions are true

Viewing a specific app screen
In addition to the trigger(s) defined above, require that a user be viewing a specific app screen.

Time has elapsed
In addition to the trigger(s) defined above, require that a specific amount of time has elapsed since the trigger event(s) occurred.

Configure Preference Center

Title
A name that helps to internally identify this preference center.

Marketing Updates

Description
A name that helps to internally identify this preference center.

Publisher A's best sales & products

Section

Name
Optional title that displays above this section.

Marketing Updates

Description
Publisher A's best sales & products

Subscriptions
Search and select previously created subscription lists for this section.

*Search App subscriptions*

New Arrivals – new_arrivals
Be the first to know about our latest items.

+ Add another section

Save and Continue

---

◁ Notification Preferences
Control alerts from Message
Publisher A

Marketing Updates
Publisher A's best sales & products
New Arrivals
Be the first to know about our latest items.

IN-APPLICATION USER INTERFACE MESSAGING

CROSS REFERENCE TO RELATED APPLICATION

This application claims the benefit of U.S. Provisional Application No. 63/230,670, filed Aug. 6, 2021. The content of which is incorporated herein by reference in its entirety.

TECHNICAL FIELD

The present disclosure generally relates to a server that distributes messages to recipients on behalf of message publishers and, more specifically, configuration of user interface messages for display via one or more in-application communication channels.

BACKGROUND

Communication channels are often associated with their own requirements, protocols and limitations. An organization may encounter technical difficulties in trying to transmit a message designed for one channel via another channel. The appearance, contents, and overall feeling of the message may be changed significantly when a different channel is used to deliver the message. In some cases, the change in channels may render the message completely undeliverable. On one hand, an organization may not be equipped with the technical specialty to freely switch messages between channels. On the other hand, sending messages through a single channel or a limited set of channels may not be an effective communication strategy. The issue could be especially challenging if communications become more interactive, such as when the message recipient may interactive with a server based on the messages sent. In addition, user interface is often part of the design of a software application. Updating the user interface may follow the development cycle of the software and may be too slow for certain situations.

BRIEF DESCRIPTION OF THE DRAWINGS

FIG. 6A illustrates an example graphical user interface (GUI) configured to receive configuration data describing settings for an in-app tour, in accordance with some embodiments.

FIG. 6D illustrates an example GUI configured to receive configuration data describing trigger conditions for an in-app tour, in accordance with some embodiments.

FIG. 7B illustrates an example GUI configured to receive configuration data describing functionality for an in-app preference center UI, in accordance with some embodiments.

Figure 1:
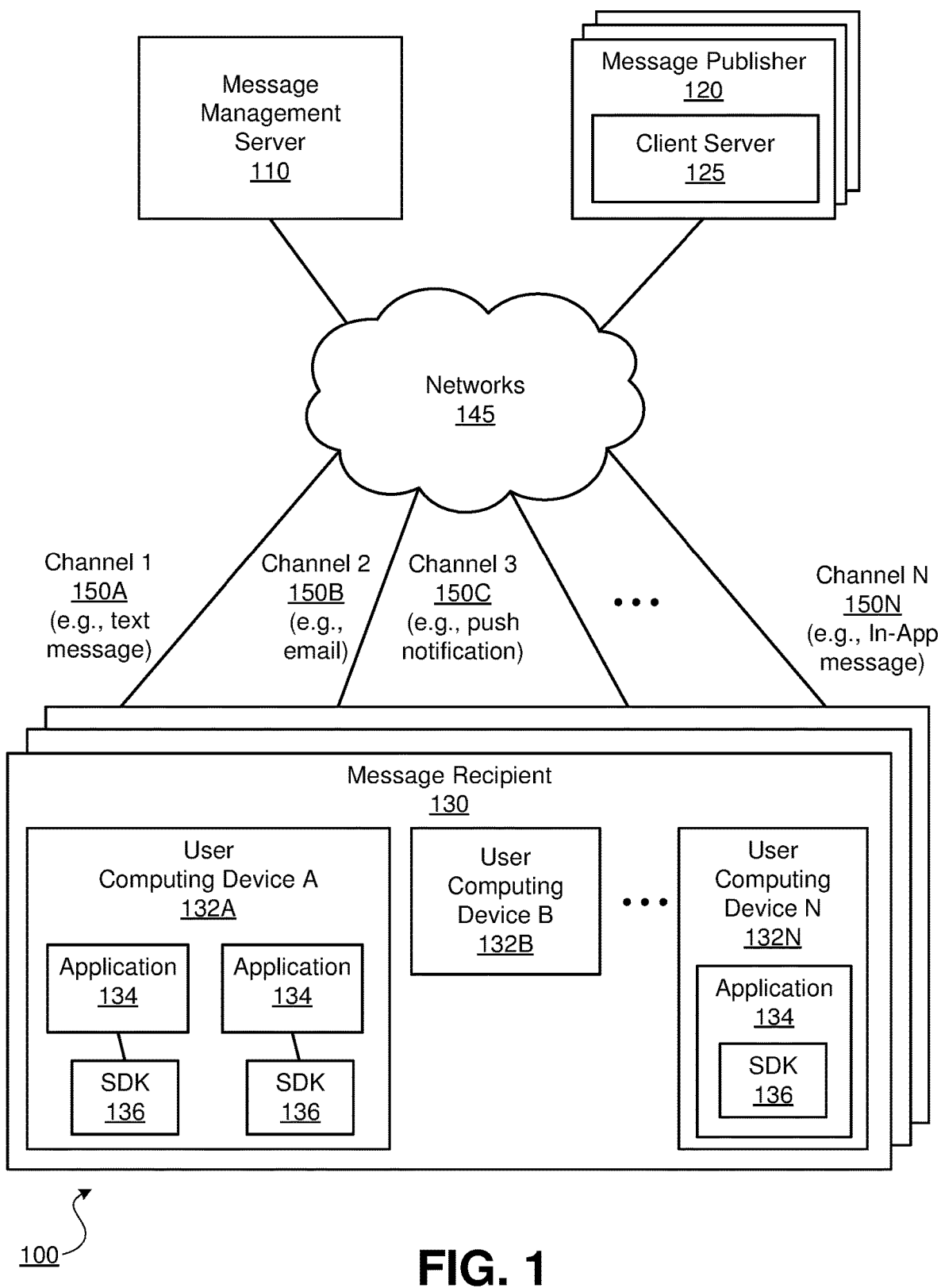
FIG. 1 is a block diagram illustrating an example system environment, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein are related to a message management server that provides a platform for message publishers to build different messages for distribution to one or more computing devices. Some of the communications to an end user may be presented in the form of an in-application (in-app) user interface (UI) overlay and in-app UI messages including configuration data describing one or more in-app UI elements for presentation within an application installed on the one or more message recipient computing devices. The messages are transmitted to message recipients via different channels, such as a software development kit (SDK) corresponding to an application on a message recipient computing device. The SDK may be operated by the message management server. A message publisher may specify various conditions for the communications, such as trigger conditions for an in-app UI overlay to be presented to a message recipient. The message management server or the SDK may monitor event notifications related to the message recipients and send messages when conditions are met. Each message may be sent via a different channel as specified by the message recipients.

The message management server may provide a platform that includes one or more graphical user interfaces configured to facilitate design of messages, e.g., by providing previews of the messages as rendered in various end user device models when the messages are delivered via the specified channels. The platform allows the message publisher to design various communication elements such as UI overlay elements, dynamic preferences in the application, surveys, and message series and to select the channels for distribution of various communication elements.

Example System Environment

Referring now to Figure (FIG. 1, shown is a block diagram illustrating an embodiment of an example system environment 100 for delivering in-app UI overlays and dynamic preference options for software applications, in accordance with an embodiment. By way of example, the system environment 100 includes a message management server 110, one or more computing devices associated with one or more message publishers 120, and one or more message recipients 130 who possess user computing devices 132. Each message recipient 130 may be associated with one or more user computing devices 132 (e.g., 132A, 132B, . . . , 132N (N being an nth device, n being some number; generally computing devices 132)). The entities and components in the system environment 100 may communicate with each other through networks 145. The message management server 110 may communicate with various user computing devices 132 through different channels 150 (e.g., 150A, 150B, 150C, . . . , 150N (N being an nth device, n being some number); generally channels 150). In various embodiments, the system environment 100 may include fewer or additional components. The system environment 100 also may include different components. Also, while some of the components in the system environment 100 may sometimes be described in a singular form, the system environment 100 may include one or more of each of the components. For example, there may be multiple message publishers 120 and multiple message recipients 130. Various message publisher 120 may be independent entities such as different customers of the message management server 110, which serves as a service provider that manages the message distribution and associated actions on behalf of the message publishers 120.

The message management server 110 may include one or more computers that perform various tasks related to configuring various types of communication elements for different message publishers 120, transmitting communication elements to various message recipients 130 on behalf of the different message publishers 120, determining conditions and channels to transmit various communications, transmitting a series of messages using different channels 150, receiving responses from message recipients 130, forwarding the responses to the message publishers 120, and, in some cases, taking actions on behalf of the message publishers 120 based on the responses from the message recipients. Communication elements may include in-app UI overlay, dynamic preference center, two-way messaging series, in-app survey, messages, and other suitable communications. For example, the message management server 110 may launch a two-way messaging campaign on behalf of a message publisher 120. The message management server 110 may send one or more messages to a message recipient 130 to solicit a response from the message recipient 130. Based on the response, the message management server 110 may perform actions on behalf of the message publisher 120. In another example, the message management server 110 may launch a cross-channel re-engagement campaign on behalf of a message publisher 120. A message recipient 130, who may be a customer of the message publisher 120, may have been inactive with the message publisher 120. The message management server 110 may send messages through different channels to attract the message recipient 130 to re-engage with the message publisher 120. Implementation of transmission of messages through different channels may be referred to as a message orchestration. The message management server 110 may facilitate configuration and/or transmittal of various types of messages, such as text messages, emails, push-notifications, browser notifications, in-applications (in-app) user interface (UI) messages, or other in-app messages. In particular, various embodiments relating to configuring, transmitting, displaying, and/or processing user interactions with in-app UI messages, which may take the form of UI overlay, are described in greater detail below with reference to FIGS. 2, 4-5, 6A-D, and 7A-B. As will be described in greater detail below, in-app UI messages include configuration data for one or more UI elements for integration into interfaces of an application. Example UI elements include widgets, input controls (e.g., buttons, switches, etc.), navigational controls, banners, various media (e.g., images, icons, etc.), standalone UIs, etc. Although in-app UI messages are described herein in relation to graphical user interfaces (GUIs), one skilled in the art will appreciate that other types of UIs may be possible (e.g., audio user interfaces).

The message management server 110 may include a combination of hardware and software. The message management server 110 may include some or all example components of a computing machine described with FIG. 7. The message management server 110 may also be referred to as a message managing platform or simply a computing server. The management server 110 may take different forms. In one embodiment, the message management server 110 may be a server computer that executes code instructions to perform various processes described herein. In another case, the message management server 110 may be a pool of computing devices that may be located at the same geographical location (e.g., a server room) or be distributed geographically (e.g., clouding computing, distributed computing, or in a virtual server network). The message management server 110 may also include one or more virtualization instances such as a container, a virtual machine, a virtual private server, a virtual kernel, or another suitable virtualization instance. The message management server 110 may provide message publishers 120 with various message management services and merchant services as a form of cloud-based software, such as software as a service (SaaS), through the networks 145. Examples of components and functionalities of the message management server 110 are discussed in further detail below with reference to FIG. 2.

Message publishers 120 are various organizations and individuals that interact with the message management server 110. The message publishers 120 may be the customers of the message management server 110. The message publishers 120 can be of different natures and can be any suitable types of organizations, natural persons, or robotic devices. For example, a message publisher 120 can be an administrator and/or developer of a software application, such as software applications 134 described in greater detail below. In another example, a message publisher 120 can be a government entity that provides important or emergency messages to citizens. In another example, a message publisher 120 can be an educational institute that sends announcements to its students through different channels 150. Some message publishers 120 may also be private businesses or individuals. In one case, a retail business may be a message publisher 120 that uses the service of the message management server 110 to distribute marketing announcements and advertisements to various message recipients 130. In another case, another retail business may use the message management server 110 to transmit gift cards, coupons, store credits, and receipts as various forms of messages to message recipients 130. In yet another case, a message publisher 120 may be an airline that sends passes (e.g., boarding passes) and flight status updates to message recipients 130. In yet another case, a message publisher 120 may be a bank that sends statements and payment reminders to message recipients 130. In yet another case, a message publisher 120 may be a news organization that sends news and articles to its subscribers. In yet another case, a message publisher 120 may be a social networking system that sends feeds and contents to message recipients 130. In yet another case, a message publisher 120 may be an individual who sends messages to his families, friends, and other connected individuals. In yet another case, a message publisher 120 may be a retail company that sends offers to its customers and the customers may make in-app purchase by directly responding to the message. These are non-exhaustive examples of message publishers 120. A message publisher 120 may be an independent entity of the message management server 110 or may control the message management server 110, depending on embodiments. Various message publishers 120 may be independent and unrelated entities, such as different unrelated businesses.

Each message publisher 120 may be associated with one or more client servers 125 that are used to communicate with the message management server 110 and message recipients 130. The client servers 125 may also be referred to as message publisher servers 125, message publisher devices 125 or client devices 125. Each client server 125 may be a computing device that can transmit and receive data via the networks 145. The client server 125 may include some or all of the example components described with FIG. 7. A client server 125 performs operations of various day-to-day tasks of the corresponding message publisher 120. For example, a bank (an example message publisher 120) may include a server 125 that manages the balances of accounts of its customers, processes payments and deposits, and performs other banking tasks. In another example, an airline (another example message publisher 120) may include a server 125 that manages the flight statuses, generate boarding passes, and manages bookings of the customers. A client server 125 may also be a server for controlling and operating software applications 132 that are published by the message publisher 120 and are installed at different user computing devices 132. The precise operations of a client server 125 may depend on the nature of the corresponding message publisher 120.

A message publisher 120 may interact directly with its customers or end users, who are examples of message recipients 130, and may delegate certain operations, such as sending certain types of messages, to the message management server 110. A message publisher 120 may maintain accounts of its users and manage day-to-day interactions with the users while directing the message management server 110 to distribute messages to the users on behalf of the message publisher 120. For example, the message publisher 120 may use a message management system provided by the message management server 110 to design messages and set conditions, channels, and intended recipients of the messages. The message publisher 120, through the message management server 110, may launch a message campaign that includes an individual messages or a series of messages to be automatically delivered to various message recipients 130. The message campaign may involve delivering various communication elements through different channels 150. Additionally, the message campaign may involve providing one or more in-app UI messages describing configurations for in-app UI elements for display to message recipients 130, such as via in-app display in an application 134 on a user computing device 132. The message campaign may also be a two-way messaging campaign that allows message recipients 130 to provide one or more responses. In some cases, the message management server 110 may take different actions based on the responses provided by the message recipients 130.

In some embodiments, a message may be considered to be transmitted from the message publisher 120 regardless of whether the message publisher's server directly sends the message or the message management server 110 sends the message.

To design an individual message or a message campaign, or to perform some other operations, a message publisher 120 may communicate with the message management server 110 through the client server 125 or a computing device associated with the message publisher 120. The methods of communication may vary depending on embodiments and circumstances. For example, an individual associated with a message publisher 120 (e.g., an employee) may communicate with the message management server 110 through a web application that is run by a web browser such as CHROME, FIREFOX, SAFARI, INTERNET EXPLORER, EDGE, etc. In another case, the message management server 110 may publish a mobile application or a desktop application that includes a graphical user interface (GUI). An individual associated with a message publisher 120 may use the mobile or desktop application to communicate with the message management server 110. In yet another case, a client server 125 may communicate directly with the message management server 110 via other suitable ways such as application program interfaces (APIs).

A message recipient 130 is an intended recipient of communication elements that may be designed by a message publisher 120 and sent from the message management server 110. Message recipients 130 may be users, customers, subscribers, viewers, or any suitable message recipients of the message publisher 120. Message recipients 130 may also be referred to as end users or simply users. Message recipients 130 can be individuals, organizations, or even robotic agents. Each message recipient 130 may possess one or more user computing devices 132. The user computing devices 132A, 132B, . . . 132N may be of different kinds. For example, a user may have a smart phone, a laptop computer, and a tablet. One or more user computing devices 132 may have the components of a computing machine illustrated in FIG. 7. Examples of user computing devices 132 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices.

User computing devices 132 may also include one or more Internet-of-Things (IoT) devices. An IoT device may be a network-connected device embedded in a physical environment (e.g., building, vehicles, appliances (home or office), etc.). In some cases, an IoT device has general processing power that is comparable to a computer. In other cases, an IoT device may have limited processing resources, low power, and limited bandwidth for communications. For example, an IoT device may be a sensor. An IoT device may be configured to gather and provide information about its physical environment. In various embodiments, an IoT device connects to the network 145 to provide information gathered from and/or associated with the environment. Data may be gathered through one or more sensors associated with the device and/or through inputs received through the device.

Some of the user computing devices 132 may be installed with an application 134 that is developed and operated by the message publisher 120. The application 134 or a portion of it may be developed using a software development kit (SDK) 136 provided by the message management server 110. For example, the application 134 may import the SDK 136 as part of the application 134. At the code level, this may be done by importing one or more libraries of functions and codes of the SDK 136 to the software code of the application 134 in the header section of the software code and having the code calling one or more functions of the SDK 136. While the message publisher 120 primarily operates the application 134, the SDK 136 allows the user computing device 132 to communicate with the message management server 110. For example, an example message publisher 120 may be a retail business that develops an application 134 for its customers to purchase items through the application 134. A customer may opt-in to allow the application 134 to track certain analytics. The analytics may be forwarded to the message management server 110 through the SDK 136. In another example, the message management server 110 may send in-application messages (in-app messages) to the message recipient 130 through the SDK 136. Upon the receipt of the message, the SDK 136 forwards the message to the software application for the message to be displayed in the application 134.

The application 134 may run on Swift for iOS and other APPLE operating systems or on Java or another suitable language for ANDROID systems. In another case, an application 134 may be a software program that operates on a desktop computer that runs on an operating system such as LINUX, MICROSOFT WINDOWS, MAC OS, or CHROME OS. A user computing device 132 may be installed with different applications 134. Each application 134 may be developed by different creators. For example, in some embodiments, a first application 134 is developed by a first message publisher 120 and a second application 134 is developed by a second message publisher 120.

The SDK 136 developed by the message management server 110 may be included by multiple applications 134. For example, multiple message publishers 120 may be customers of the message management server 110 and include the SDK 136 in the applications 134 developed by the message publishers 120, as illustrated in the user computing device A 132A. Each application 134 may communicate to an instance of the SDK 136 through the functions and libraries of the SDK 136 included in the application 134. Each instance of the SDK 136 may be associated with a unique SDK identifier that is used to identify the instance of the SDK 136 in a particular user computing device 132. Each application 134 that includes the SDK 136 may be associated with a unique channel identifier that is used to identify the application 134 by the message management server 110. For example, when a new application 134 is installed in a user computing device 132 and the new application 134 has imported the functionality of the SDK 136, the message management server 110 may assign a new channel identifier for the newly installed application 134. The message management server 110 may send in-app messages to different applications through the SDK 136 by using different channel identifiers.

In some embodiments, the SDK 136 manages in-app UI overlay and dynamic preference options provided to message recipients 130. In-app UI overlay includes data describing configurations for in-app UI elements for in-app display within the application 134 on a user computing device 132. Dynamic preference options are option menus that can be used to change one or more configuration of an application 134. The option menus are dynamic because a message publisher 120 may change the items in the option menus through the message management server 110 without causing a change of computer code or an update to the application 134. As such, non-computer programmers (e.g., business personnel) may be able to change the configuration of the application 134 and provide new options to the end users without having to request the software developer to launch a new software version.

The SDK 136 may communicate with the message management server 110 to receive or otherwise obtain in-app UI messages including configuration data corresponding to in-app UI elements, such as configuration data defining display constraints or criteria, display styles, assets, trigger conditions, channels, intended recipients, or other suitable data usable to render in-app UI elements. The SDK 136 may further communicate with the application 134 in order to render in-app UI elements within the application 134, such as to augment a UI of the application 134 with a UI element (e.g., via a popup or modal) or to navigate to a standalone UI provided by the message management server from a UI of the application 134. In some embodiments, the configuration data for an in-app UI element includes representation of a design of the in-app UI element (e.g., a markup language or data structure) as provided via one or more GUIs or other interfaces of the message management server 110, such as by the message publisher 120. In this case, the SDK 136 may process the design representations (e.g., markup language, CSS schemes, or other front-end UI elements and configurations) in order to render the in-app UI element for display within the application 134. The SDK 136 may additionally, or alternatively, process user interactions with in-app UI elements via communication with one or both of the application 124 and the message management server 110. Various embodiments of the SDK 136 managing in-app UI messages transmitted by the message management server 110 are described in greater detail below with reference to FIGS. 2 and 4-5.

The message management server 110 may associate end users with SDK identifiers and channel identifiers to identify the applications 134 and the computing devices 132 that are possessed by a particular end user. The identification of the end users may allow the message management server 110 to send cross-channel messages to a particular end user. In some embodiments, when a new application 134 is installed in a user computing device 132, the message management server 110 may associate the new channel identifier with the end user. Based on pre-authorization or upon the user's authorization when prompted, the end user may use the user-specific information and credentials that are saved in the message management server 110 or another source for the new application 134 without having to re-enter the information. The user may perform certain in-app actions, such as purchases, with simplified procedures, such as without having to re-enter payment information or verifying credentials.

The networks 145 provide connections to the components of the system environment 100 through one or more subnetworks, which may include any combination of the local area and/or wide area networks, using both wired and/or wireless communication systems. In one embodiment, the networks 145 use standard communications technologies and/or protocols. For example, a network 145 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 145 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 145 may be represented using any suitable format, such as hypertext markup language (HTML), extensible markup language (XML), JavaScript object notation (JSON), structured query language (SQL). In some embodiments, all or some of the communication links of a network 145 may be encrypted using any suitable technique or techniques such as secure sockets layer (SSL), transport layer security (TLS), virtual private networks (VPNs), Internet Protocol security (IPsec), etc. The networks 145 also include links and packet switching networks such as the Internet.

The message management server 110 may transmit messages to message recipients 130 via different channels 150. A channel 150 may be associated with a communication protocol or another non-standard method. A channel 150 may also be referred to as a communication channel Examples of channels 150 include text messaging services (e.g., SMS, MMS), emails (e.g., mobile emails, plain text emails, browser emails), push notification protocols (e.g., APPLE push notification, ANDROID push notification), instant messaging applications (WHATSAPP, WECHAT, TELEGRAM), in-application messages (e.g., messages sent within application 134), social networking systems (e.g., FACEBOOK, TWITTER), RSS feeds, web browser notifications, other suitable protocols such as simply message payloads sent as an Internet packet or a series of packets. The message management server 110 may decide that a message is to be transmitted through one or more channels based on the setting provided by the message publisher 120. The details of the selection of channels will be discussed in further detail below with reference to FIGS. 2 and 3.

A channel 150 may or may not correspond to a user computing device 132. For certain types of channels 150, the user computing device 132 that will receive the message is fixed. For example, for an SMS message, the user computing device 132 that is associated with the phone number will receive the message. An in-app message may also be sent to the user computing device 132 with which the application 134 is installed. A message intended for an IoT device may also be sent using a channel 150 that is associated with the IoT device. Yet, in other cases, the user computing device 132 that is going to receive the message is not fixed. For example, a message recipient 130 may read an email message from more than one user computing device 132.

In some cases, a user computing device 132 may be installed with multiple applications 134 that have included the SDK 136 developed by the message management server 110. In such cases, the SDK 136 has a different channel identifier associated with each application 134. The in-app messages for different applications 134 are considered to be sent via different channels. In some embodiments, an in-app message to a message recipient 130 and the response of the recipient for a particular application 134 may be communicated through a specific application channel that does not cross talk with other in-app messages associated with different applications 134.

Example Message Management Server Components

Figure 2:
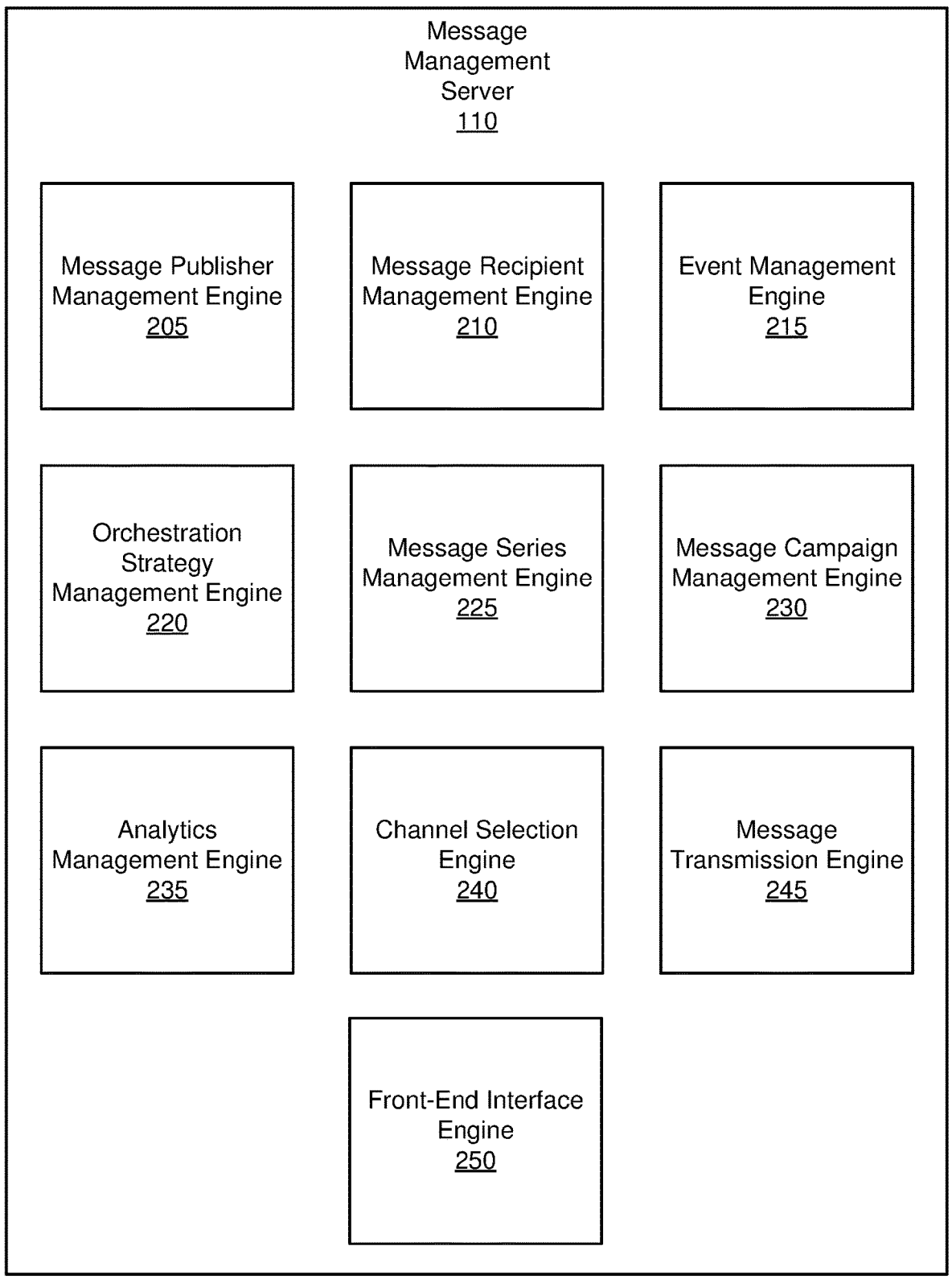
FIG. 2 is a block diagram illustrating various components of an example message management server, in accordance with some embodiments.

FIG. 2 is a block diagram illustrating various components of an example message management server 110, in accordance with some embodiments. A message management server 110 may include a message publisher management engine 205, a message recipient management engine 210, an event management engine 215, an orchestration strategy management engine 220, a message series management engine 225, a message campaign management engine 230, an analytics management engine 235, a channel selection engine 240, a message transmission engine 245, and a front-end interface engine 250. In various embodiments, the message management server 110 may include fewer or additional components. The message management server 110 also may include different components. The functions of various components in message management server 110 may be distributed in a different manner than described below. Moreover, while each of the components in FIG. 2 may be described in a singular form, the components may present in plurality.

The components of the message management server 110 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 9.

The message publisher management engine 205 manages the profiles and credentials of message publishers 120 and stores saved templates and saved messages for the retrieval of the message publishers 120. For example, a customer that intends to use the message publisher management engine 205 to launch a message campaign to distribute messages to various end users may create an account with the message management server 110. The message management server 110 stores the customer's profile, metadata, credential and associate the information with a unique customer identifier, such as publisherID. The customer (an example of a message publisher 120) may create message templates, message series templates, digital pass templates (e.g., digital boarding passes and digital coupons), specify criteria of message distribution and goals of message campaigns, select or specify types of events and analytics to be captured by the message management server 110, and configure other settings with the message management server 110. The templates and settings are associated with the customer identifier and can be retrieved, duplicated, edited, and deleted based on the message publisher's preferences and actions entered through a message management application and/or API provided by the message management server 110. The message management application also may enable (or provide for display) one or more graphical user interfaces (GUIs) for rendering on, for example, a user computing device 132. Examples of GUIs of the message management application will be discussed in further detail with reference to FIGS. 6A-D and 7A-B.

By way of example, the message publisher management engine 205 may include a message publisher profile database, which may also store information including filter preferences, event types, message publisher server destination, and predictive and automation settings for registered users. In other embodiments, the message publisher account database may also store additional services that a message publisher 120 would like to interface with, including the number of active streams associated with the message publisher 120. For example, these additional services can be other message publishers and/or strategic partners. Continuing with the example, a message publisher 120 may optionally choose to create three active streams. One stream may be associated with a server configured to receive a stream generated associated with a message publisher 120 at a specific server destination, e.g., www.foo.com, another with a server associated with a social media system, e.g., FACEBOOK, TWITTER, PINTEREST, etc., and the last with a server associated with a message publisher organization. In some example cases, the preferences associated with a message publisher profile may be a username and/or destination address. The message management server 110 may also be configured to accept additional message publisher preferences. This additional message publisher information may capture targeted demographics information, spending habits, travel habits, and other such details.

In some embodiments, the message publisher management engine 205 may also store credentials or access keys of message publishers 120. The message publisher 120 may provide the message management server 110 an access key, such as an API access key with a particular level of access privilege, for the message management server 110 to query the third-party system to retrieve information of the end users.

The message recipient management engine 210 manages the message recipients 130 to whom the messages are sent. A message publisher 120 may specify a set of intended message recipients 130. A message recipient 130 may be associated with a recipient identifier, recipientID. Depending on whether a message recipient 130 is identified as possessing a user computing device 132, applications 134, and/or SDK 136, the message recipient management engine 210 may also associate the recipientID with one or more of a device identifier, application identifier (which may be in the form of channel identifier), and SDK identifier. For example, each user computing device 132 associated with the message recipient 130 may be associated with a device identifier, deviceID. For some devices, the message recipient management engine 210 may also store application identifier, applicationID, for identifying actions occurred at or related to an application 134 and track in-app messages sent through the application 134. A set of recipientIDs, deviceIDs, and applicationIDs may be associated with a publisherID.

The message recipient management engine 210 may maintain metadata tags for message recipients 130. For metadata tags may include information such as whether a recipient is a natural person or not, preferences of the message recipients 130, opt-in or opt-out options of the message recipients 130 (e.g., a message recipient may opt-out for receiving a message from a particular channel), and other characteristics of the message recipients, including consented information such as gender, age, interested products, interested news, etc. Based on the characteristics of the message recipients 130, the message recipient management engine 210 may categorize the message recipients into one or more groups. The message recipient management engine 210 may also store records of messages sent to each message recipient 130, such as metadata of the messages (e.g., date and time of the messages, the channel identifier, channelID, used to send a particular message), the payloads of the messages, actions taken or related to each sent message, and types of devices and deviceIDs to which the message are sent.

The event management engine 215 manages and stores events associated with message recipients 130, user computing devices 132, or applications 134. The events may be transmitted from the message publishers 120, from third parties, or from the user computing devices 132.

Events transmitted from the message publishers 120 or third parties may trigger a distribution of one or more messages by the message management server 110 to different message recipients 130. By way of example, a message publisher 120 may be an airline that transmits an event notification to the message management server 110 that a flight is delayed and identifies the passengers of the flight based on the recipientIDs. Based on the event notification, the message management server 110 may send a message to the passengers. In another example, a message publisher 120 may be a bank that sends an event notification to the message management server 110 that an end user has settled a transaction. Based on the event notification, the message management server 110 sends a confirmation message to the end user. In yet another example, the event may be transmitted from a third party. The message management server 110 may identify message recipients 130 that are potentially affected by the event notified by the third party.

The events may also be sent from various user computing devices 132 associated with message recipients 130. Those event notifications may be referred to as mobile event notifications. Each mobile event notification may be associated with a message recipient 130 and be saved along with an event identifier, eventID, a messageID and a recipientID. Mobile event notifications may be transmitted from mobile event sources. In various embodiments, a mobile event source may be an IoT device or a user computing device 132 running an application 134. The application 134 is configured to generate and transmit a mobile event notification. For example, the SDK 136 may include code instructions to cause a user computing device 132 to collect information describing an occurrence of an event and/or transmit a mobile event notification corresponding to the occurrence of the event to the message management server 110. A mobile event notification may be related to a user computing device 132 or may be specific to a particular application 134 that is in communication with the SDK 136.

A mobile event notification from a user computing device 132 may include a notification payload and a destination associated with a message publisher 120. In various embodiments, the destination is a network address such as a message publisher computer, a proxy server, or another device configured to receive data streams from message management server 110. For example, the destination may be a specified universal resource locator (URL), e.g., "www.message publisher.com/proxyserver". The notification payload associated with a mobile event notification, received by message management server 110, may include an event descriptor and a notification identifier.

The event descriptor may include at least one of an application lifecycle event, a user engagement event, a user behavior event, a user insight event, a user location event, or any combination thereof. In one example, an event descriptor is an application lifecycle event such as a "first open" of an application 134, an "inactivity" event (e.g., an application 134 has been inactive), an "app open" event, an "app close" event, or an "app uninstall" event; a user engagement event such as a "push", a "push send", a "rich deliver", a "rich read", a "rich delete", an "in application display", a "digital pass object install" or a "digital pass object remove"; a user behavior event such as a "tag update" event, an "app open" event, an "app close" event, or other custom events defined by a message publisher 120. In some embodiments, the event descriptor may also include a user location event such as geolocation, or timestamp data or a user insight event associated with a prediction of a future application lifecycle event, user engagement event, user behavior event, user location event, or any combination thereof. For the ease of reference, all those events, whether they are related to application lifecycle, user engagement, location, or timestamp, may be collectively referred to application lifecycle events.

By way of example of a mobile event notification, a user computing device 132 (e.g., a mobile phone, an IoT device) sends a mobile event notification to message management server 110 if the user computing device 132 is within a threshold distance of a store of a message publisher 120, or if the user opens the application 134 or interacts with an IoT device.

A notification identifier may include an identification of the notification and other identification information. For example, the identification may include a userID, an applicationID, a message publisherID, a deviceID, deviceType, or any combination thereof. For example, a mobile event notification generated by a user computing device 132 associated with a user "Nolan" may include a message that a user associated with userID: "Nolan", a deviceID: "02", an event descriptor: "app uninstall" associated with a message publisherID: LATTE, INC., at Time: 11:00 PM PST near a location of 123 Main Street, Portland, Oregon.

In some embodiments, a mobile event source is an IoT device associated with a message publisher 120. An IoT device may be configured to transmit a mobile event notification to message management server 110. For example, an IoT device may be a temperature sensor that generates a mobile event notification with the current temperature and transmits the generated mobile event notification to the message management server 110 via network 145.

In some embodiments, upon receiving a mobile event notification from a user computing device 132, the event management engine 215 generates a mobile event token. The mobile event token may be derived (e.g., a hash) in some way from the received mobile event notification and/or metadata relating thereto. In some embodiments, a single mobile event token is assigned to a plurality of received mobile event notifications. Additionally, as used herein, the process of generating a mobile event token from a mobile event notification may be referred to as "decorating a received mobile event notification" and can be used to provide context to mobile event notifications received from a user computing device 132.

In some embodiments, the event management engine 215 may generate the mobile event token by communicating with a number of contextual services. The event management engine 215 may include code segments for generating a mobile event token including assigning context obtained from one or more contextual services. Contextual services may further include any number of modules that extract timestamp data, demographic data associated with a user, GPS data, historical data including historical trends, or any combination thereof from a received mobile event notification. For example, upon receiving a mobile event notification associated with an "app open" event from a user computing device 132, the event management engine 215 generates a mobile event token including a timestamp and a GPS location associated with the received event. In other embodiments, the contextual data assigned to a mobile event token associated with a mobile event notification may be associated with a certain user computing device 132 including one or more identifiers. In still other embodiments, the message management server 110 may decorate a mobile event token with a predicted user behavior including a future user engagement event, an application lifecycle event, or any combination thereof. U.S. Pat. No. 10,567,536, entitled "Mobile Event Notification for Network Enabled Objects," patented on Feb. 18, 2020, is hereby incorporated by reference for all purposes.

In some embodiments, the SDK 136 maintains a set of active in-app UI elements intended for display in the application 134 in response to mobile event-related trigger conditions being met. The SDK 136 may receive in-app UI element messages from the message management server 110 including configuration data for active in-app UI elements including one or more trigger conditions from the message management server 110. In this case, the SDK 136 may update the set of active in-app UI elements based on the received configuration data and/or configure listeners for mobile event notifications corresponding to the one or more trigger conditions. If the SDK 136 determines that the one or more trigger conditions are met, the SDK 136 may communicate with the one or both of the application 134 or the message management server 110 in order to render the in-app UI element for display in the application 134. Embodiments of operations performed by the SDK 136 for rendering in-app UI elements are described in greater detail below with reference to FIG. 4.

In some embodiments, the SDK 136 maintains in-app dynamic preference center UIs for display in the application 134. Similarly to active in-app UI elements described above, the SDK 136 may receive configurations for in-app preference center UIs from the message management server 110. Preference center UI configurations describe in-app UI elements that facilitate user configuration of various user preferences (e.g., app settings). Preferences may correspond to user preferences for operations performed by the message management server 110, such as what types or through what channels a user computing device 132 or application 134 receives from the message management server 110. Additionally, or alternatively, preferences may correspond to user preferences for the application 134. The SDK 136 may embed a mechanism for navigating to an in-app preference center UI corresponding to a preference center UI message received from the message management server 110, such as a button or other interactable UI element. Additionally, or alternatively, the SDK 136 may receive notifications messages from the message management server 110 through one or more channels external to the application 136 (e.g., a push notification, an email, a text message, etc.) including a deep link to an in-app preference center UI. Embodiments of operations performed by the SDK 136 for rendering in-app preference center UIs are described in greater detail below with reference to FIG. 5.

The orchestration strategy management engine 220 stores strategies and rules provided by message publishers 120 for the transmission of messages to various message recipients 130. In some message campaigns, the same message may be sent to a message recipient 130 through multiple channels 150 or a series of related messages may be sent to the message recipient 130 through different channels 150. The transmission of messages through different channels 150 may be referred to as channel orchestration. For example, a message publisher 120 may set up a message series for a payment reminder. The first reminder message may be sent through a less disruptive channel 150 such as by an email. Subsequent reminder messages may be sent through more disruptive channels 150 such as a publish notification, an in-app notification, and an SMS message.

The orchestration strategy management engine 220 may allow a message publisher 120 to pick different channel selection rules for each message or a series of messages. Example channel selection rules may include channel priority with fall back, last active, originating channel, and fan out option. When the message management server 110 sends a message to a message recipient 130, the message management server 110 selects one or more channels 150 based on the channel selection rules associated with the message.

A channel selection rule for channel priority with fall back allows a message publisher 120 to select the priority of the channels to send a message and select fall back channels if a higher-priority channel(s) is not available. A channel selection rule may be applicable to a large group of message recipients 130. The message recipient management engine 210 may provide a list of available channels 150 (e g, channels that are opted in, or not opted out) for each intended message recipient 130. Each intended message recipient 130 may be associated with a different list of available channels 150. The message management server 110 attempts to send the message to the highest priority channel first and falls back to alternative channels if a message recipient 130 does not opt in for the highest priority channel.

The channel selection rule for the last active channel or the originating channel specifies that the message management server 110 sends a message based on the message recipient's last active channel or the originating channel. The event management engine 215 may provide mobile event notifications that include information on whether a user has taken an action (e.g., opening a message, responding to an email, etc.) with respect to a channel 150. If the user takes an action that triggers the message management server 110 to send another message, the new message may be sent to the same channel. This reaction by the message management server 110 may be selected by the originating channel selection rule. The originating channel selection rule may also specify that the message management server 110 to target a channel 150 associated with a trigger event. For example, the message publisher 120 may direct the message management server 110 to send a message when a trigger event is detected from a channel 150 or associated with an application related to a channel 150. For example, a message publisher 120 may specify that a new message is to be sent when a location event is detected (e.g., a device enter a radius or a territory of a location). The location event may be sent from an application 134. The message management server 110 may send the new message through an in-app message or a push notification associated with the application 134.

The channel selection rule for fan-out specifies that the message management server 110 to send the same message to a message recipient 130 through multiple channels 150 simultaneously or within a reasonable timeframe. A message publisher 120 may select multiple channels 150 for the fan-out option. For a specific message recipient 130, the message management server 110 sends the message through various channels 150 unless one or more channels are opted-out by the message recipient 130.

The message series management engine 225 allows message publishers 120 to design a message series. Each message series may be referred to as a journey. A message series may include a series of related messages that are sent to a message recipient 130 when a certain condition is met. The message series management engine 225 manages the message series that are designed and saved by various message publishers 120. A message series may be associated with a start condition, an end condition, message recipient selection criteria, a message order, message branching, and trigger conditions and channels 150 to be used for each message in the series.

A start condition may include various rules that specify when a message series will be triggered for a particular candidate message recipient 130. A trigger condition may be an event, such as a mobile event when the message management server 110 receives a mobile event notification. For example, a message series may be triggered when a user first opens the application 134. A trigger condition may also be another event whose notification is provided the message publisher 120 or a third party. For example, a message series may begin 24 hours after a user has created an account with the message publisher 120. Other trigger condition may include tag change, inactivity, first seen, location matching, location attributes, and an event occurring. The start condition may also include timing and date for the first message in the message series to be sent after a trigger condition is met. In some cases, the message series starts immediately after a trigger condition is met. In other cases, the message series is scheduled based on the timing and date. The start condition may also include certain limitations. For example, the limitation may prevent the message management server 110 from involving a message recipient 130 in more than a certain number of message journeys within a predetermined period of time. The limitation may also prevent the message management server 110 from involving a message recipient 130 in a repeated message journey. A trigger condition may also be a risk factor such as a churn risk associated with an application 134 or a channel 150.

An end condition may include various rules that specify when a message series is completed. A message publisher 120 may specify that a message series is completed after all messages in the series are sent. Other end condition examples may specify rules for a message series to end prematurely. For example, a message series may end on a conversion event or a cancellation event. A conversion event is associated with a conversion condition. The message management server 110 may exit a message recipient 130 when the conversion event is detected. For example, in a marketing campaign, when a message recipient 130 clicks on an advertisement that is sent as a message, the message publisher 120 may specify that the clicking of the advertisement is a successful conversion. In another example, if the message series is for reminding a user to make a monthly payment, the conversion event may be that the user has made the monthly payment. A cancellation event may be an event that is indicated by the message recipient 130 or the message publisher 120 to stop the message series when the cancellation event is detected. For example, a message recipient 130 may want to opt-out or unsubscribe from the message series. The message recipient selection criteria allow a message publisher 120 to select what users will be selected for a particular message series. The selection criteria could be event-based, metadata tag-based, device-type-based, channel-based, or any combination thereof.

The message order and message branching allow a message publisher 120 to select how the messages in a series are arranged. A message series can be linear or can be branched. The message publisher 120 may also specify conditions to skip one or more messages.

The trigger conditions and channels 150 to be used for each message in the series are rules that are specified by a message publisher 120 indicating conditions for how or when a message will be provided to a user via one of the channels 150. For example, a trigger condition for a message may define conditions that to be met for the message to be transmitted by the message management server 110 via a channel of the channels 150. As another example, a trigger condition for a message may define conditions to be met for the SDK 136 to provide a message to a user of the user computing device 132, such as by displaying an in-app UI or UI element. The trigger condition for a message may be time-based. For example, a second message may be sent 2 days after the first message is sent. The trigger condition for a message may also be event-based, such as when the message management server 110 receives a mobile event notification that matches the trigger condition. The event-based trigger condition may also include a time element such as a delay after the event condition is met. Other trigger conditions discussed in this disclosure are also possible. For each message, a message publisher 120 may also select a channel selection rule based on the discussion above with reference to the orchestration strategy management engine 220.

In some embodiments, a message series may include one or more in-app UI messages, other types of messages, or some combination thereof. For example, a first in-app UI element corresponding to a first in-app UI message in a message series may facilitate access to a second in-app UI element (e.g., via a user interaction) corresponding to a second in-app UI message in the message series. In cases where the message series includes one or more in-app UI messages, the message management server 110 or the SDK 136 may evaluate the start or end conditions for the individual in-app UI messages relative to other in-app UI messages in the message series. For instance, the SDK 136 may begin listening for one or more start conditions for a second in-app UI message after a first in-app UI message in the message series has been triggered.

In some embodiments, a message publisher 120 may design a message series that is a two-way messaging series. In one of the trigger conditions in the series, the condition options may include no response from the message recipient 130 and various types of responses from the message recipient 130. When no response is received, the message management server 110 may allow the message publisher 120 to specify that another message is to be sent, which is to be sent by the same channel or by a different channel. This allows the message series to attract the message recipient 130 to re-engage in the message series. If a response is received, the message management server 110 parses the response and determines the action to be taken based on the response. The action may be sending another message to the recipient 130 or may be an activity to be performed by the message management server 110, such as creating a purchase order, canceling a subscription, making a purchase, generating a statement, performing a customer service, issuing or reissuing a mobile pass, etc.

To analyze the response, the message management server 110 may parse the response in various ways. In some embodiments, the message management server 110 may analyze the string pattern and search for keywords in the response. For example, the message management server 110 may search for keyword that represents the message recipient 130 authorizing an action (e.g., making a purchase). The message management server 110 may also look for keywords such as quantity, item name, object name, and named entity in the response. In some embodiments, the message management server 110 may also employ one or more natural language processing technique to analyze the response. In some cases, the response may also include authentication keyword such as a PIN or a password from the message recipient that authorizes a certain transaction. For example, in a message series, the message management server 110 may send an offer of an item on behalf of a message publisher 120 to an end user. The end user may provide an in-app response to the message to authorize a purchase. The message management server 110 may complete the in-app purchase upon proper authentication and authorization procedures.

The message campaign management engine 230 manages message campaigns designed by various message publishers 120. A message campaign may be a goal-based collection of multiple related message series. For example, a message publisher 120 may design a goal-to-goal branching of multiple message series. Each message series may have a goal that is specified in the end condition of message series. The message series are linked together in any suitable ways, branched or linear, cyclic or acyclic. A message campaign may also be referred to as a primary message plan.

The selection of message series in a message campaign may depend on the recipient's response in one or more two-way message series. For example, in a re-engagement campaign, the message management server 110 may determine that the recipient did not provide a response to messages that are sent in one of series. A chunk model may be to determine a threshold level of whether a particular end user has churned with respect to the usage of an application 134. In turn, the message management server 110 may select message series that include communications in other channels to attract the end user to re-engage with the application 134. In another example, an end user may provide a response in a two-way messaging series. Based on the type of response and the goal specified by the message publisher 120 when designing the message campaign, the message management server 110 may select different subsequent message series to be sent to the recipient 130.

The analytics management engine 235 provides statistics and analytics for messages, message series and message campaigns. After messages are sent to message recipients 130, the message management server 110 may receive responses from the message recipients 130, mobile event notifications, or other notifications related to the messages. For some of the messages, the message management server 110 may also receive no action from the recipients or any notification at all. A message management server 110 may keep track of the number of users in each message series, actions taken by the users (or inactions) after receiving messages, and other metrics such as rates of meeting certain trigger criteria. A message publisher 120 may start a message series or a message campaign in real-time. The message management server 110 may display how many users (message recipients 130) are in each message series and other live analytics in real-time for each message or each message series as a summary of the progress of each message series. The analytics management engine 235 may also provide statistics related to commercial activities in a message series.

For example, in a two-way message series, recipients 130 may make various in-app purchases. The analytics management engine 235 may provide conversion rate of the message series for messages sent that resulted in one or more purchases.

The channel selection engine 240 selects one or more channels 150 for transmitting or distributing a message. The channel section engine 240 may select the channels 150 based on the channel selection rules specified by the message publisher 120 as discussed in the orchestration strategy management engine 220. The channel selection engine 240 may also perform a channel retargeting operation. The message management server 110 may monitor events such as user behaviors in one channel 150 and decide to send follow up messages in a message series to the users on a different channel. For example, the message management server 110 may determine an application churn risk with respect to a user. In response to the churn risk being higher than a threshold, the message management server 110 may decide to change an in-app message to another channel that is less reliant on the application (e.g., an email channel). The message management server 110 may monitor the interaction or lack of action of the users with one or more messages to determine whether the user receives messages on alternative channels. The message management server 110 may switch from a channel 150 that is tied to one or more applications (e.g., push notification, in-app message, web notification, instant messages in a chat application) to another channel 150 that is more independent. U.S. patent application Ser. No. 15/646,008, entitled "Churn Prediction with Machine Learning," filed on Jul. 10, 2017, is incorporated by reference for all purposes.

The message transmission engine 245 formats messages in appropriate forms, applies certain communication protocols and transmits the messages to message recipients 130. In some embodiments, the message transmission engine 245 may receive text and images of a message payload from a message publisher 120. For example, the message publisher 120 may design a message using an application provided by the message management server 110. Certain message channels and user computing devices 132 may require a message format in order for the message to be transmitted. For example, an SMS message may not contain an image. The format of a push notification may depend on the operating system of the user computing device 132. The appearances of certain messages may also be affected by the display resolution of the user computing devices 132. The message transmission engine 245 may package a message payload based on the selected channel. The message transmission engine 245 may convert the payload to an appropriate format that is compatible with a message channel, such as JSON, XML, key-value pairs, HTML, etc. Certain channels may also be associated with specific communication protocols. For example, emails may use standard mail protocols, such as Simple Mail Transfer Protocol (SMTP). A message may also need certain headers to be transmitted. The message transmission engine 245 may generate the message payload and convert the payload to one or more network packets to be sent to the message recipients 130.

The message transmission engine 245 may also check rules and timing that may restrict the transmission of a message to a specific message recipient 130. For example, a message publisher 120 or a message recipient 130 may restrict the timing for transmitting certain messages (e.g., a do-not-disturb period). There may also be other rules that restrict the transmission of messages to certain recipients 130. The transmission of message may also be subject to one or more privacy settings of the end users, such as options that limit the channels used, options that limits tracking of data and usage, types of messages that are authorized to be sent, subscription and unsubscribe options, etc.

The front-end interface engine 250 may be a software application interface that is provided and operated by the message management server 110. For example, the message management server 110 may provide a software system for message publishers 120 to design and manage various messages, message series, and message campaigns. Examples of the GUI elements of the front-end interface engine 250 for configuring in-app UI elements and/or stand-alone UIs are shown in FIGS. 6A-D and 7A-B. The application provided by the message management server 110 may be distinguished from the application 134 shown in FIG. 1. The application provided by the message management server 110 may be an application for message publishers 120 to manage their message campaigns. In contrast, the application 134 may be provided by a message publisher 120 for its end users. For example, the application 134 may be a retail business application in which users can purchase items and manage coupons. The application provided by the message management server 110 provides a management platform for the retail business application to manage its message campaigns, such as promotional and marketing messages and two-way messaging to be sent to end users.

The front-end interface engine 250 may take different forms. In one embodiment, the front-end interface engine 250 may control or be in communication with an application that is installed in a client device 125. For example, the application may be a cloud-based SaaS or a software application that can be downloaded in an application store (e.g., APPLE APP STORE, ANDROID STORE). The front-end interface engine 250 may be a front-end software application that can be installed, run, and/or displayed at a client device 125. The front-end interface engine 250 also may take the form of a webpage interface of the message management server 110 to allow message publishers 120 to access data and results through web browsers. In another embodiment, the front-end interface engine 250 may not include graphical elements but may provide other ways to communicate with message publishers 120, such as through APIs. The API may be in compliance with any common API standards such as Representational State Transfer (REST), query-based API, Webhooks, etc. The data transferred through the API may be in formats such as JSON and XML.

Example Message Object Hierarchy

Figure 3:
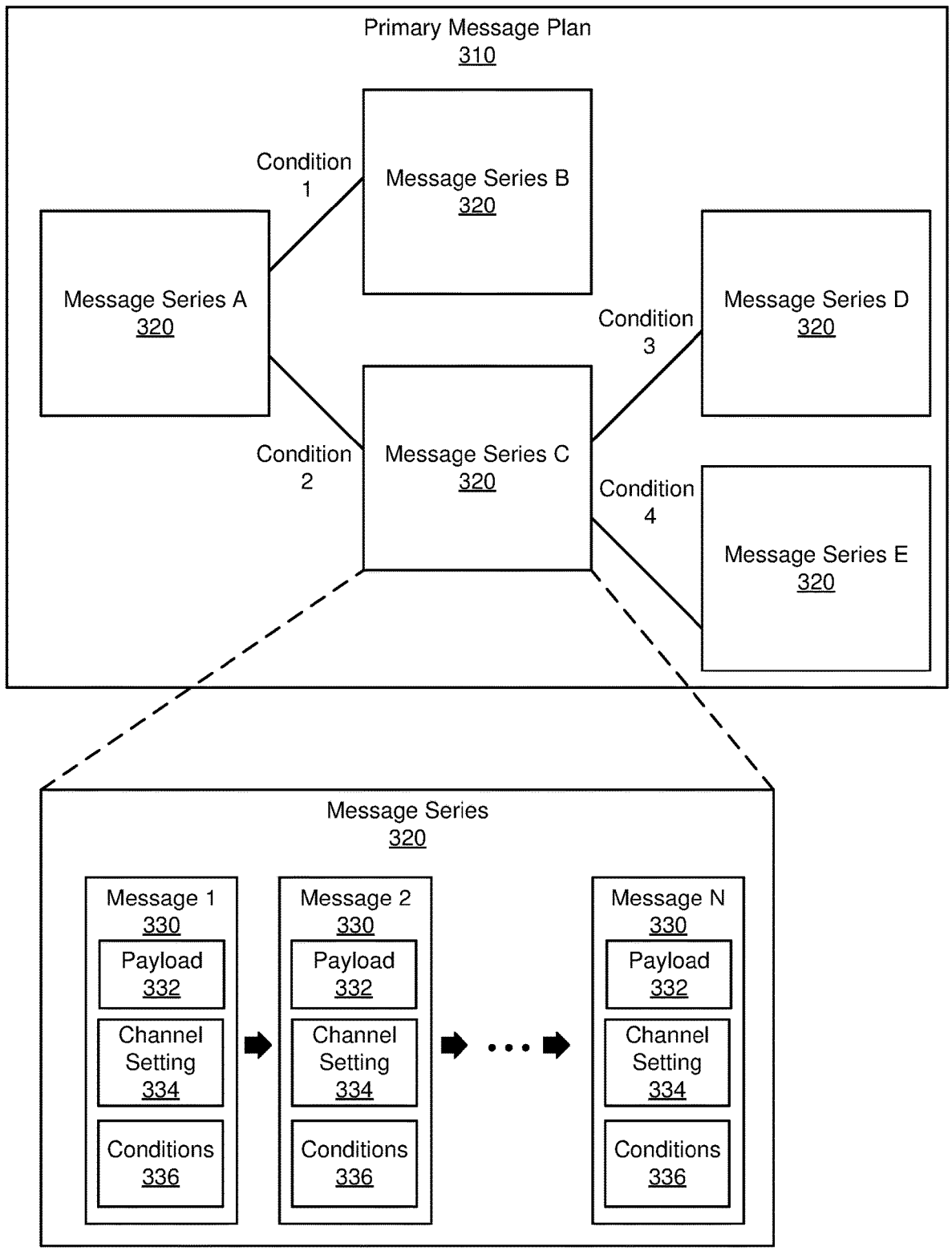
FIG. 3 is a block diagram illustrating an example message object hierarchy that may be used with the message management server, in accordance with some embodiments.

FIG. 3 is a block diagram illustrating an example message object hierarchy that may be used with the message management server 110, in accordance with some embodiments. A primary message plan 310 may include multiple series 320. The primary message plan 310 may also be referred to as a message campaign. Each message series 320 may be referred to as a message journey. Each message series 320 may include one or more messages.

The message series 320 in the primary message plan 310 may be connected in any suitable ways, branched or linear, cyclic or acyclic. The primary message plan 310 may be associated with a set of target recipient criteria that specify which candidate message recipients 130 may enter the message campaign associated with the primary message plan 310. The selection criteria may also be the trigger condition of the first message series A in the primary message plan 310. For example, a candidate message recipient 130 who meets the trigger condition of the first message series A will receive the first message in the message series A and be enrolled in the primary message plan 310. Each message series 320 may be associated with an end condition that is discussed above with reference to the message series management engine 225 in FIG. 2. In some embodiments, a message series 320 may include two or more alternative end conditions, such as the condition 1 and the condition 2 shown in FIG. 3. The message management server 110 may enroll the message recipient 130 to another message series based on the fulfillment of one of the alternative conditions. In some embodiments, except the first message series A, other message series' start condition may be the end condition of the preceding message series based on the branching and connections among the message series 320.

The end condition of a message series 320 may be a goal of the message series 320. For example, the goal of sending a series of messages to a message recipient 130 may be to induce the recipient to perform a certain action. The message management server 110 may receive an event notification from a user computing device 132 or from the message publisher 120. The action of the message recipient 130 meeting the end condition of a message series 320 may be a goal of the message series 320. The inaction of the message recipient 130 may be end condition of the same message series 320. Based on the end condition, the message recipient 130 is routed to another succeeding message series 320. Based on the end conditions of various message series 320, the primary message plan 310 provides a goal-to-goal branching of message series 320.

Each message series 320 may include one or more messages 330 that may be connected in any suitable ways, branched or linear, cyclic or acyclic. A message publisher 120 may arrange the order and branching of the messages 330 and compose each message 330. The message publisher 120 may design the payload 332, the channel setting 334, and the conditions 336 triggering a specific message. The message payload 332 may include text, image contents, and multimedia contents such as voice, videos, and music. The channel setting 334 may be based on the channel selection rules as discussed above with reference to the orchestration strategy management engine 220. The message publisher 120 may also specify criteria related to channel retargeting or allow the message management server 110 to automatically perform the channel retargeting. The message publishers 120 may also specify the conditions 336 for triggering a message 330 to be sent. The conditions 336 may specify that a succeeding message is sent automatically or after a time delay. The conditions 336 may also specify a mobile event notification for the triggering of a special message. A message 330 may be skipped if the conditions 336 are not met. Other possible conditions are discussed above with reference to the message series management engine 225.

In a message series 320, one or more conditions may include responses from the message recipient so that the message series 320 is an example of two-way messaging series. The message management server 110 may perform an action based on the response. For example, the message publisher 120 may design a message series that classifies possible responses into various categories. The message publisher 120 may define the action for each category. For example, for a response that specifies a purchase action, the message series 320 may include a condition that directs the message management server 110 to complete the purchase transaction. For another response that specifies the end user's interest in a particular product item, the message series 320 may include a branch of subsequent messages that are to be sent to the message recipients to further promote the product item.

While digital marketing and commerce is used as an example of the implementation if a two-way messaging series, two-way messaging may be used in various other settings, such as managing user preferences (e.g., via UI preference center messages), customer service, customer reengagement, distribution of announcement, management of emergency, boarding pass management, bank service, subscription management, personal messaging, group administration, survey, and any other suitable implementations, whether the implementation is public or private, commercial or governmental, mass distribution or personalized messages, and product related or service related.

Example Two-Way Messaging Transmission Process

Figure 4:
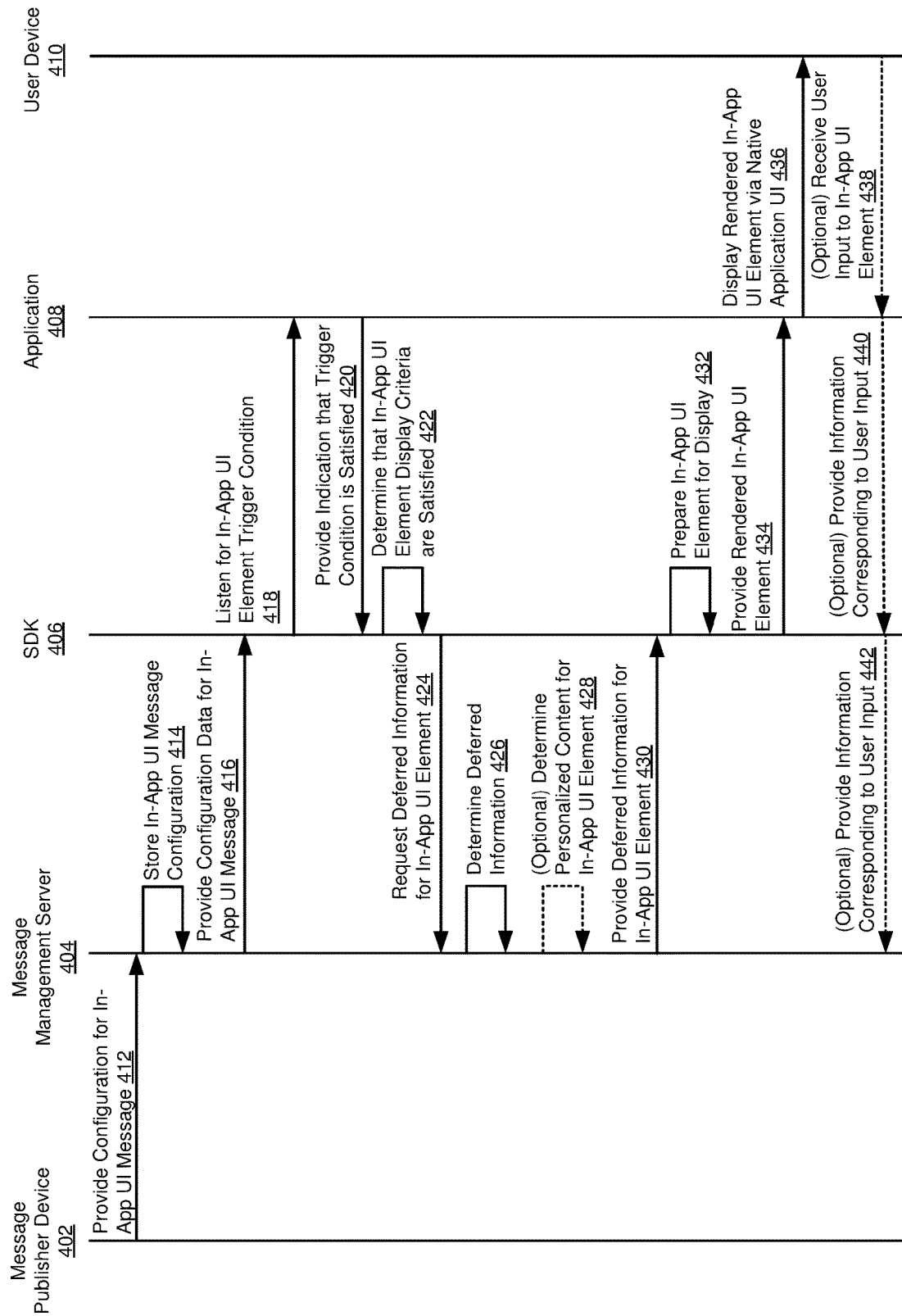
FIG. 4 is a sequence diagram illustrating a sequence of interactions among various entities to manage in-app UI messages, in accordance with some embodiments.

FIG. 4 is a sequence diagram illustrating a sequence of interactions 400 between entities of the system environment 100 to manage in-app UI overlay, in accordance with some embodiments. The sequence of interactions 400 illustrated in FIG. 4 represents specific sets of instructions that may be stored in a computer-readable medium, such as memory. The instructions, when executed by one or more processors of the depicted entities, cause the one or more processors to perform the described interactions. As depicted in FIG. 4, the sequence of interactions 400 is performed by a message publisher device 402 (e.g., the client server 125 or another computing device associated with the message publisher 120), a message management server 404 (e.g., the message management server 110), an SDK 406 (e.g., the SDK 136), an application 408 (e.g., the application 134), and a user device 410 (e.g., the user computing device 132). The sequence of interactions 400 depicted in FIG. 4 is merely an example sequence of interactions, and in other embodiments the sequence of interactions may include fewer, additional, or different actions performed by the same or different entities.

In the sequence of interactions 400, the message publisher device 402 provides 412 a configuration for an in-app UI message to the message management server 404. In the embodiment depicted in FIG. 4, the in-app UI element message describes a UI element for in-app display in the application 408. As an example, an administrator of the application 408 may interact with one or more GUIs provided by the message management server 404 on the message publisher device 402 to generate configuration data for an in-app UI message, as described above with reference to the FIG. 1. As depicted in FIG. 4, the in-app UI message includes a configuration for a UI element for in-app display in the application 408. The configuration data may further include other information, such as design representation of the in-app UI element.

After receiving the configuration for the in-app UI message, the message management server 404 stores 414 the in-app UI message configuration. For example, the message management server 404 may store the configuration in a data store corresponding to a message publisher associated with the message publisher device 402. The message management server 404 further provides 416 configuration data for the in-app UI message to the SDK 406. For instance, the message management server 404 may provide some or all of the configuration data included in the configuration provided by the message publisher device 402. In particular, the configuration data includes one or more trigger conditions and one or more display criteria for the in-app UI element described by the configuration for the in-app UI message, as described in greater detail below with reference to interactions 418-422.

Using the provided configuration data 416, the SDK 406 listens 418 for the one or more in-app UI trigger conditions included in the configuration data. For example, the SDK 406 may add the in-app UI element defined by the configuration data to a set of active in-app UI elements for which the SDK 406 monitors the application 408 for trigger conditions. At some time after the SDK 406 begins to listen 418, the application 408 provides 420 an indication that the one or more trigger conditions are satisfied to the SDK 406. For example, the application 408 may provide a mobile event notification to the SDK 406 indicative of the one or more trigger conditions, as described above with reference to the message series management engine 225. As another example, the SDK 406 may process data describing user actions or other events received from the application 408 to determine that the one or more trigger conditions are satisfied. After determining that the trigger condition is satisfied, the SDK 406 determines 422 that display criteria for the in-app UI element are satisfied. The display criteria may include various rules for displaying the in-app UI element, such as criteria defining what types or segments of users the in-app UI element can be displayed to (e.g., based on user demographics or user message subscriptions, etc.), criteria defining one or more states of the application 408 that the in-app UI element can be displayed in (e.g., a particular interface of the application 408 that the in-app UI element is displayed with), criteria defining a duration of the display of the in-app UI element, criteria defining a frequency at which the in-app UI element can be displayed, or any other suitable display criteria. In cases where the SDK 406 determines that the display criteria are not satisfied, the SDK 406 may monitor the application 408 for the display criteria to be satisfied or may abort a current attempt to display of the in-app UI element.

After determining 422 that the display criteria are satisfied, the SDK 406 requests deferred information for the in-app UI element. Deferred information includes information usable for rendering the in-app UI element that is stored on the message management server 404. For example, deferred information may include additional configuration data included in the configuration for the in-app UI message that was not provided as part of interaction 416. Additionally, or alternatively, deferred information may include information determined by the message management server 404 by processing configuration data in the configuration for the in-app UI message. Responsive to the request 424, the message management server 404 determines 426 the deferred information for the in-app UI element and provides 430 the deferred information to the SDK 406. In some cases, the in-app UI element may not be associated with any deferred information and some or all of the interactions 424, 246, or 430 may be skipped. As indicated by the dashed line, the message management server 404 may optionally determine 428 personalized content for the in-app UI element. For example, the personalized content may include information customized to a user of the user device, such as personal information of the user or information determined based on historical interactions by the user with the application 408 or the user device 410. The message management server 404 may provide the personalized content to the SDK 406 with the deferred information or separately. In the same or different embodiments, the message management server 404 or the SDK 406 may determine that the in-app UI element should not be displayed based on deferred information, in which case the SDK 406 may abort display of the in-app UI element.

After receiving deferred information for the in-app UI element, the SDK 406 prepares 432 the in-app UI element for display. For example, the SDK 406 may retrieve asset files for rendering the in-app UI element, such as images, audio, video, icons, or other relevant assets. Such assets may be included in the configuration data for the in-app UI element or may obtained elsewhere, e.g., from the message management server 404 or another entity. Additionally, or alternatively, the SDK 406 may pre-render the in-app UI element for providing to the application 408 after the application 408 is ready to display the in-app UI element. For example, the SDK 406 may process a design representation for the in-app UI element included in configuration data received from the message management server 404 in order to render the in-app UI element, as described above with reference to the SDK 136. After preparing the In-app UI element for display, the SDK 406 provides 434 a rendered version of the in-app UI element to the application 408. The rendered version of the in-app UI element may be overlayed on top of the existing application 1408. For instance, the SDK 406 may provide the rendered in-app UI element to the application for rendering over a native UI of the application 408 (e.g., as a popup or widget).

After receiving the rendered in-app UI element, the application 408 displays 436 the rendered in-app UI element via a native application UI of the application 408 on an electronic display of the user device 410. For example, the application 408 may render the native application UI overlaid with the rendered in-app UI element. Alternatively, the application 408 may render the native application UI with the render in-app UI element integrated into a portion of the native application UI. For example, if the in-app UI element is a banner, the application 408 may render the native application UI with the banner seamlessly integrated into a suitable portion of the native application UI.

As indicated by the dashed line, the user device 410 may optionally receive a user input to the in-app UI element displayed on the electronic display of the user device 410. For example, the in-app UI element may include one or more interactable features, such as a button or link. In this case, a user of the user device 410 may provide a user input by interacting with the one or more interactable features, such as by selecting one of the interactable features or by providing an input value (e.g., a numerical or textual value). The application 408 may optionally provide 440 information corresponding to the user input to the SDK 406. Similarly, the SDK 406 may optionally provide 442 information corresponding to the user input to the message management server 404. Based on the provided information, the message management server 404 may perform various operations, such as transmitting one or more additional messages or message series to the SDK 406 or another channel, or updating information corresponding to the application 408, the user device 410, the user of the user device 410.

In some embodiments, the message management server 404 and/or the SDK 406 facilitate rendering of in-app UIs for the application 408 that include web views (e.g., rendered HTML windows) integrated into in-app UI elements provided by the message management server 404. As an example, the application 408 or SDK 406 installed on the user device 410 may not be configured to render some or all of an in-app UI element described by configuration data (e.g., a design representation) in an in-app UI message received from the message management server. In this case, the message management server 404 and/or the SDK 406 may perform a backup process to render the relevant in-app UI element by rendering some or all of the in-app UI element using a web view (e.g., as defined by HTML or another web-based markup language, CSS elements, JavaScript, etc.). If the web view represents a portion of an in-app UI element, the SDK 406 may seamlessly integrate the web view into an overall rendering of the in-app UI element, e.g., to appear as if rendered without a web view. As an example, if an in-app UI element is a list including a container and a list items within the container, the SDK 406 may render the container via processing of a design representing for the in-app UI element and render one or more of the individual items within the list as web views using a web markup language. The web markup language used to render the web views may be included in configuration data provided to the SDK 406 by the message management server 402.

Figure 5:
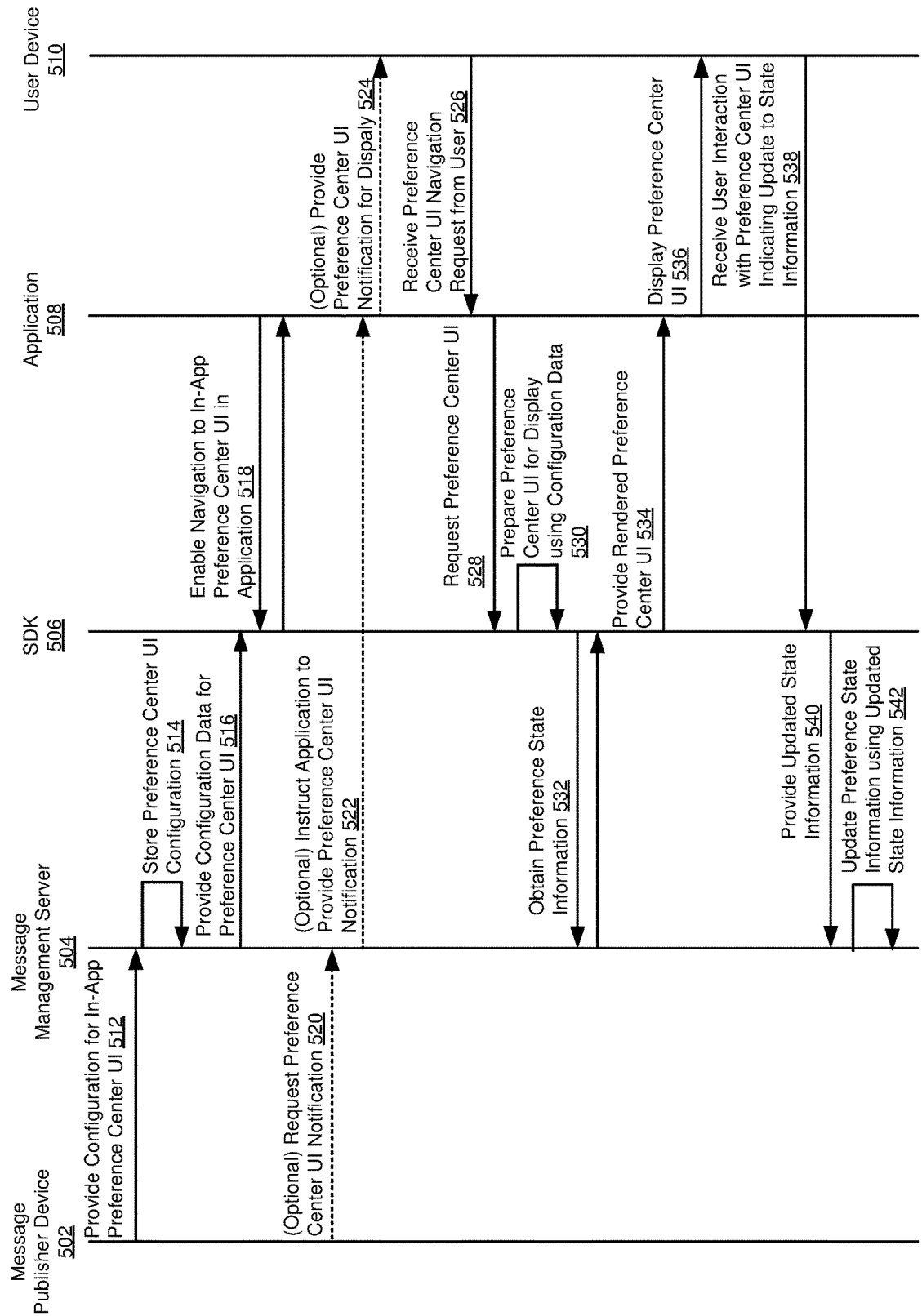
FIG. 5 is a sequence diagram illustrating a sequence of interactions among various entities to manage in-app preference centers, in accordance with some embodiments.

FIG. 5 is a sequence diagram illustrating a sequence of interactions 500 between entities of the system environment 100 to manage in-app dynamic preference centers, in accordance with some embodiments. The sequence of interactions 500 illustrated in FIG. 5 represents specific sets of instructions that may be stored in a computer-readable medium, such as memory. The instructions, when executed by one or more processors of the depicted entities, cause the one or more processors to perform the described interactions. As depicted in FIG. 5, the sequence of interactions 500 is performed by a message publisher device 502 (e.g., the client server 125 or another computing device associated with the message publisher 120), a message management server 504 (e.g., the message management server 110), an SDK 506 (e.g., the SDK 136), an application 508 (e.g., the application 134), and a user device 510 (e.g., the user computing device 132). The sequence of interactions 500 depicted in FIG. 5 is merely an example sequence of interactions, and in other embodiments the sequence of interactions may include fewer, additional, or different actions performed by the same or different entities.

In the sequence of interactions 500, the message publisher device 502 provides 512 a configuration for an in-app preference center message to the message management server 504. The in-app preference center message describes a preference center UI for in-app display in the application 508, e.g., as described above with reference to interaction 412 of the sequence of interactions 400. As an example, an administrator of the application 508 may use the platform provided by the message management server 504 on the message publisher device 502 to generate configuration data for a preference center UI, as described above with reference to the FIG. 1. The configuration for the in-app dynamic preference center includes the types of selections and option menus from which an end user may select. By selecting different preferences, the end user may further cause the application to be changed according to the preference. The message publisher may adjust the preference choices available to the end user through the platform provided by the message management server 504.

After receiving the configuration for the in-app preference center, the message management server 504 stores 514 the preference center configuration. For example, the message management server 504 may store the configuration in a data store corresponding to a message publisher associated with the message publisher device 502. The message management server 504 further provides 516 configuration data for the preference center UI to the SDK 506. For instance, the message management server 504 may provide some or all of the configuration data included in the configuration provided 512 by the message publisher device 502.

After receiving the configuration data for the preference center UI, the SDK 506 enables 518 navigation to the in-app preference center UI from within the application 518. For example, the SDK 506 may communicate with the application 508 in order to integrate a button, link, or other UI element into a UI of the application 508 that can receive user interactions to prompt the application 508 to display the preference center UI. The SDK 506 and/or application 508 may embed an in-app UI element in an interface of the application 508 for navigating to in-app the preference center UI without considering some or all of the conditions described above with reference to interface 420-436. For example, the SDK 506 and/or application 508 may display the UI element in an interface of the application 508 every time the interface is displayed by the user device 510 without considering additional trigger conditions or display criteria.

After enabling 518 navigation to the in-app preference center UI, the user device 510 receives 526 a request from a user of the user device 510 to navigate to the preference center UI. In some cases, the user may provide the request by interacting with an in-app UI element displayed in an interface of the application 508, e.g., as described above with reference to the interaction 518. In other cases, the user device 510 may display a notification via one or more channels (e.g., a push notification, email, SMS, etc.) including a deep link to the in-app preference center UI, such as described by optional interactions 520-524. In this case, the user device 510 may receive 526 the request based on a user interaction with the notification. As an example of this case, the message publisher device 502 requests 520 a preference center UI notification to be displayed on one or more user devices via one or more channels. Based on the request 520, the message management server 504 instructs 522 the application 508 to provide a preference center UI notification. The message management server 504 may instruct 522 the application 508 via the SDK 506 or may communicate directly with the application 508. Responsive to the instructions, the application 508 provides the preference center UI notification to the user device 510 for display.

After receiving the navigation request, the application 508 requests 528 the preference center UI from the SDK 506. Based on the request 528, the SDK 506 prepares 530 the preference center UI for display using the configuration data provided by the message management server 504. The SDK 506 may perform similar actions to prepare 530 the preference center UI for display as those described above with reference to the interaction 432 of the sequence of interactions 400. In particular, the SDK 506 may determine display constraints, assets, and/or data requirements for the preference center UI. The SDK 506 further obtains 532 preference state information for the application 508 and/or the user device 510. The preference state information may include a current set of preferences for the application 508 and/or the 510. The preference state information may additionally, or alternatively, include information describing historical actions by a user of the application 508 or the user device 510, such as topics that the user has indicated an interest in on the application 508. After obtaining 532 the state information, the SDK 506 provides 534 a rendered preference center UI to the application 508. The SDK 506 may render the preference center UI using the configuration data, information determined as part of preparing 530 the preference center UI for display, the preference state information, or some combination thereof. In some embodiments, the SDK 506 obtains various information usable to display the preference center UI from the message management server 504 at some time before the application 508 requests 528 the preference center UI, e.g., in order to reduce latency. For example, the SDK 506 may periodically request relevant information from the message management server 504.

After receiving the rendered preference center UI, the application 508 displays 536 the preference center UI on an electronic display of the client device 510. For instance, the application 508 may display the preference center UI as a widget within the application 508. After displaying the preference center UI, the user device 510 receives 538 a user interaction with the preference center UI that indicates an update to the state information. For example, a user may provide an input indicating a change to a current preference, such as subscribing or unsubscribing to messages associated with the message publisher. In other cases, the application 508 or another system component communicates changes to preferences or other updates to the SDK 506 or the message management server 504 without receiving a user interaction with a displayed in-app preference center UI (e.g., via API function calls). In such cases, the SDK 506 may update a display of the in-app preference center UI based on changes communicated by the application 508 or other system component.

Based on the interaction, the SDK 506 determines an update to the preference state information that reflects the update indicated by the user interaction. The SDK 506 provides 540 the updated state information to the message management server 504. As an example, the SDK 506 may provide updated state information to the message management server 504 corresponding to a relevant subset of an overall set of preference state information. In this case, the message management server 504 may subscribe to updates to particular preferences or preference state information at the SDK 506. Using the updated state information, the message management server 504 updates 542 the preference state information stored at the message management server 504.

In some embodiments, the message management server 504 provides configuration data for in-app UI elements to the SDK 506 that include information corresponding to an in-app preference center. For example, an in-app UI element may be an in-app tour that includes information explaining features of the application 508 related to a preference center. In this case, in-app UI elements of the in-app tour may include a button or other interactable element for configuring a particular preference within the corresponding preference center. In response to a user interaction with the button or other interactable elements, the SDK 506 may perform a set of operations to update relevant preference state data, as described above with reference to interactions 538-542.

Example Graphical User Interfaces

FIGS. 6A-D are conceptual diagrams illustrating a set of example graphical user interfaces (GUIs) configured to receive configuration data for in-app UI elements, in accordance with some embodiments. The GUIs shown in FIG. 6A through FIG. 8 may also be referred to as a portal for message publisher, which may be part of a SaaS portal provided by the message management server 110. The GUIs depicted in FIGS. 6A-D may be provided by the message management server 110 to a message publisher computing device (e.g., the client server 125) to receive configuration data for in-app UI elements from the message publisher 120, such as described above with reference to the front-end interface engine 250. As depicted in FIGS. 6A-D, the set of GUIs are particularly configured to receive one or more in-app UI elements representing an application tour. An application tour may include one or more in-app UI elements (e.g., popups) that include information explaining one or more features of an application (e.g., the application 134). One skilled in the art will appreciate that similar GUIs can be used to generate other types of in-app UI elements.

FIG. 6A illustrates an example GUI 600 configured to receive configuration data describing settings for an in-app tour. In the embodiment shown, the GUI 600 is configured to facilitate user adjustment of settings related to scheduling, categorizing, and tagging the in-app tour. In other embodiments the GUI 600 may be configured to facilitate user adjustment of fewer, additional, or different settings for the in-app tour. As depicted in FIG. 6A, the GUI 600 includes toggle switches corresponding to individual types of settings. In response to one if the toggle switches being toggled by a user, the GUI 600 may display additional information and/or interactable elements for configuring the relevant type of setting, such as via a dropdown menu. For example, if the toggle switch for the "start date" setting is toggled, the GUI 600 may display additional interactable elements configured to receive a start date for display of UI elements for the in-app tour.

Figure 6B:
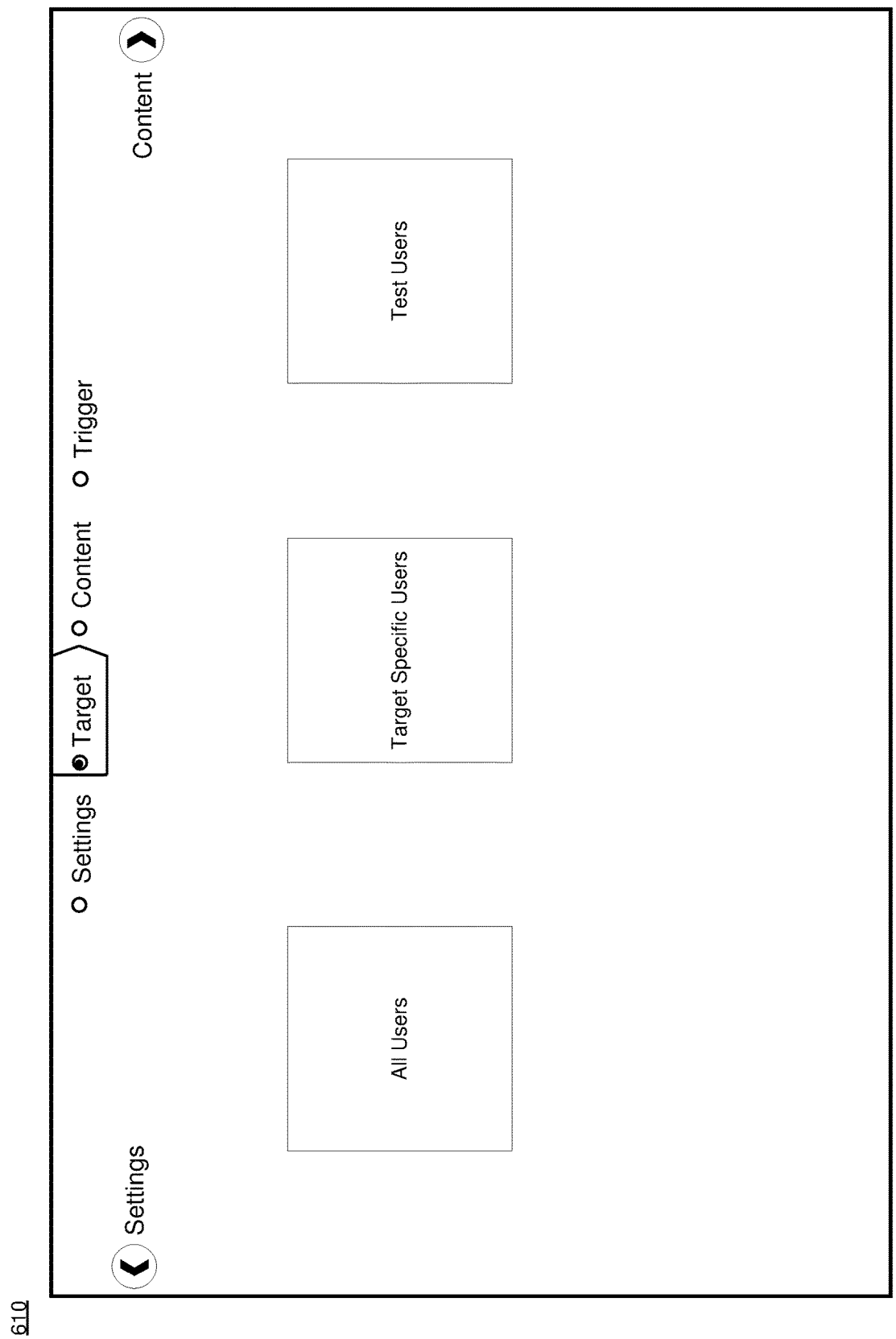
FIG. 6B illustrates an example GUI configured to receive configuration data describing target users for an in-app tour, in accordance with some embodiments.

FIG. 6B illustrates an example GUI 610 configured to receive configuration data describing target users for an in-app tour. In the embodiment shown, the GUI 610 is configured to receive a user selection of a type of target user segment for the in-app tour. In particular, the target user segments include "all users," "specific users," or "test users." In other embodiments the GUI 610 may be configured to receive user selection of fewer, additional, or different types of target user segments for the in-app tour. In response to a user selection of one of the target user segments by a user, the GUI 610 may display additional information and/or interactable elements for configuring setting for the relevant target user segment, such as via a popup menu.

Figure 6C:
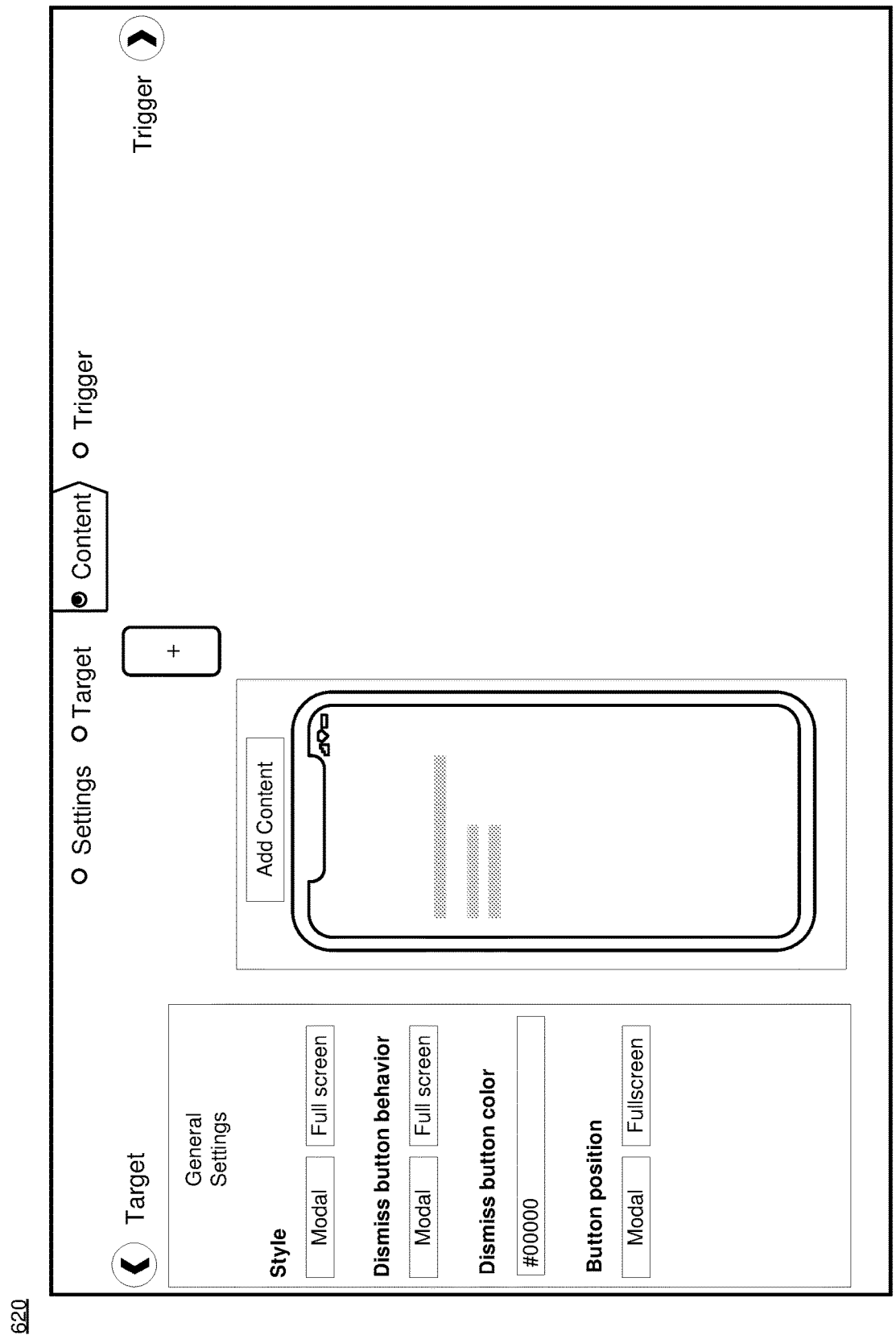
FIG. 6C illustrates an example GUI configured to receive configuration data describing content for an in-app tour, in accordance with some embodiments.

FIG. 6C illustrates an example GUI 620 configured to receive configuration data describing content for an in-app tour. In the embodiment shown, the GUI 620 is configured to facilitate design of one or more in-app UI elements. The GUI 620 includes interactable elements for configuring general settings of the in-app tour content, e.g., a style, dismiss button behavior, dismiss button color, and a button position. Additionally, the GUI 620 includes a virtual mobile computing device screen for simulating an appearance of an in-app UI element as displayed in an application. The virtual mobile computing device screen has an associated button to "add content," and in response to a user interaction with the "add content button" the GUI 620 may display additional information and/or interactable elements for configuring the visual appearance of the relevant UI element, such as via a separate content customization GUI. Furthermore, the GUI 620 includes an interactable button immediately below the GUI labels at the top of the GUI 620 for adding additional virtual mobile computing device screens for designing additional UI elements for the in-app tour. In other embodiments the GUI 620 may be include fewer, additional, or different mechanisms for designing content of the in-app tour.

FIG. 6D illustrates an example GUI 630 configured to receive configuration data describing trigger conditions for an in-app tour. In the embodiment shown, the GUI 630 is configured to facilitate user adding and/or adjustment of trigger events for one or more in-app UI elements of the in-app tour (e.g., an initial UI element) Additionally, the GUI 630 includes mechanisms for adjusting display criteria for the in-app tour, e.g., a screen of an application that must be displayed in order for UI elements of the in-app tour to be displayed and a duration that must elapse before UI elements of the in-app tour can be displayed after previously being displayed. Similarly to the GUI 600, the GUI 630 includes toggle switches corresponding to individual types of display criteria, wherein the GUI 630 may display additional information and/or interactable elements for configuring the relevant type of display criteria, such as via a dropdown menu. In other embodiments the GUI 630 may be configured to facilitate adding and/or adjusting fewer, additional, or different types of trigger conditions, display criteria, or other conditions of the in-app tour.

Figure 7A:
FIG. 7A illustrates an example GUI configured to receive configuration data describing general information for a new in-app preference center, in accordance with some embodiments.

FIGS. 7A-B are conceptual diagrams illustrating a set of example graphical user interfaces (GUIs) configured to receive configuration data for in-app preference centers, in accordance with some embodiments. The GUIs depicted in FIGS. 7A-B may be provided by the message management server 110 to a message publisher computing device (e.g., the client server 125) to receive configuration data for in-app preference centers from the message publisher 120, such as described above with reference to the front-end interface engine 250. One skilled in the art will appreciate that similar GUIs can be used to generate other types of in-app UIs.

FIG. 7A illustrates an example GUI 700 configured to receive configuration data describing general information for a new in-app preference center. For example, the message management server 110 may provide the GUI 700 for display on a message publisher computing device responsive to a request from the message publisher computing device to add a new preference center for an application (e.g., the application 134). As depicted in FIG. 7A, the GUI 700 includes interactable elements for receiving information that generally identifies a new in-app preference center, including a name, a type, a unique identifier, and a description. In other embodiments the GUI 700 may include interactable elements for receiving fewer, additional, or different information that generally identifies the in-app preference center.

FIG. 7B illustrates an example GUI 710 configured to receive configuration data describing functionality for an in-app preference center UI. Similarly to the GUI 630 describe above with reference to FIG. 6D, the GUI 710 includes a virtual mobile computing device screen for simulating an appearance of an in-app preference center UI as displayed in an application. The GUI 710 further includes interactable elements for providing information to populate the in-app preference center UI with content, e.g., UI elements for configuring user preferences. As depicted in FIG. 7B, information provided using the interactable elements is reflected on the simulated appearance of the in-app preference center. In other embodiments the GUI 710 may include interactable elements for providing fewer, additional, or different information for populating the in-app UI preference center with content.

In some embodiments, the message management server 110 may generate design representations of in-app UI elements (e.g., in-app tours or preference centers) using a structure corresponding to interactive elements of the GUIs depicted in FIGS. 6A-D or 7A-B. For example, the message management server may generate a markup language representation of an in-app UI element that defines in-app UI elements based on content added to a virtual mobile computing device on the GUI 620 or 710.

Figure 8:
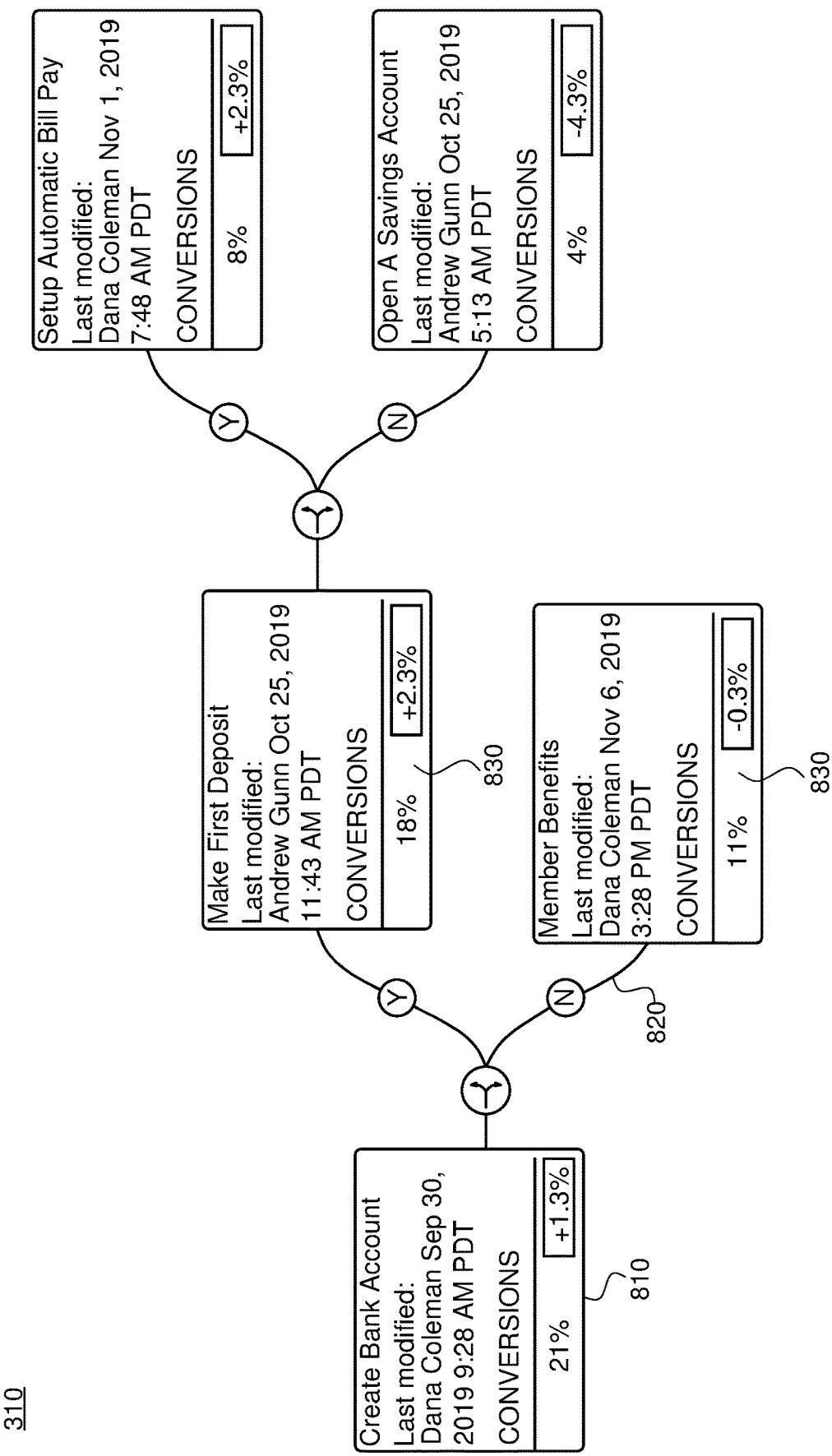
FIG. 8 is an example of a visual representation of a primary message plan that includes real time statistics, in accordance with some embodiments.

FIG. 8 is an example of a visual representation of a primary message plan 310 that includes real time statistics, in accordance with some embodiments. The message management server 110 may provide a platform (e.g., an online application) for various message publishers 120 to design and build one or more primary message plans 310. The primary message plan 310 may be displayed at a GUI of a client device 125 of a message publisher 120. The visual representation of a primary message plan 310 may include multiple nodes 810 and edges 820. The nodes are represented by the rectangular boxes. Each node represents a message series 320. An edge connecting two nodes represents a transition between two message series 320. If one or more message series includes commercial offering, such as in-app purchases offerings, the GUI may also display conversion rate of the commercial offering.

Computing Machine Architecture

Figure 9:
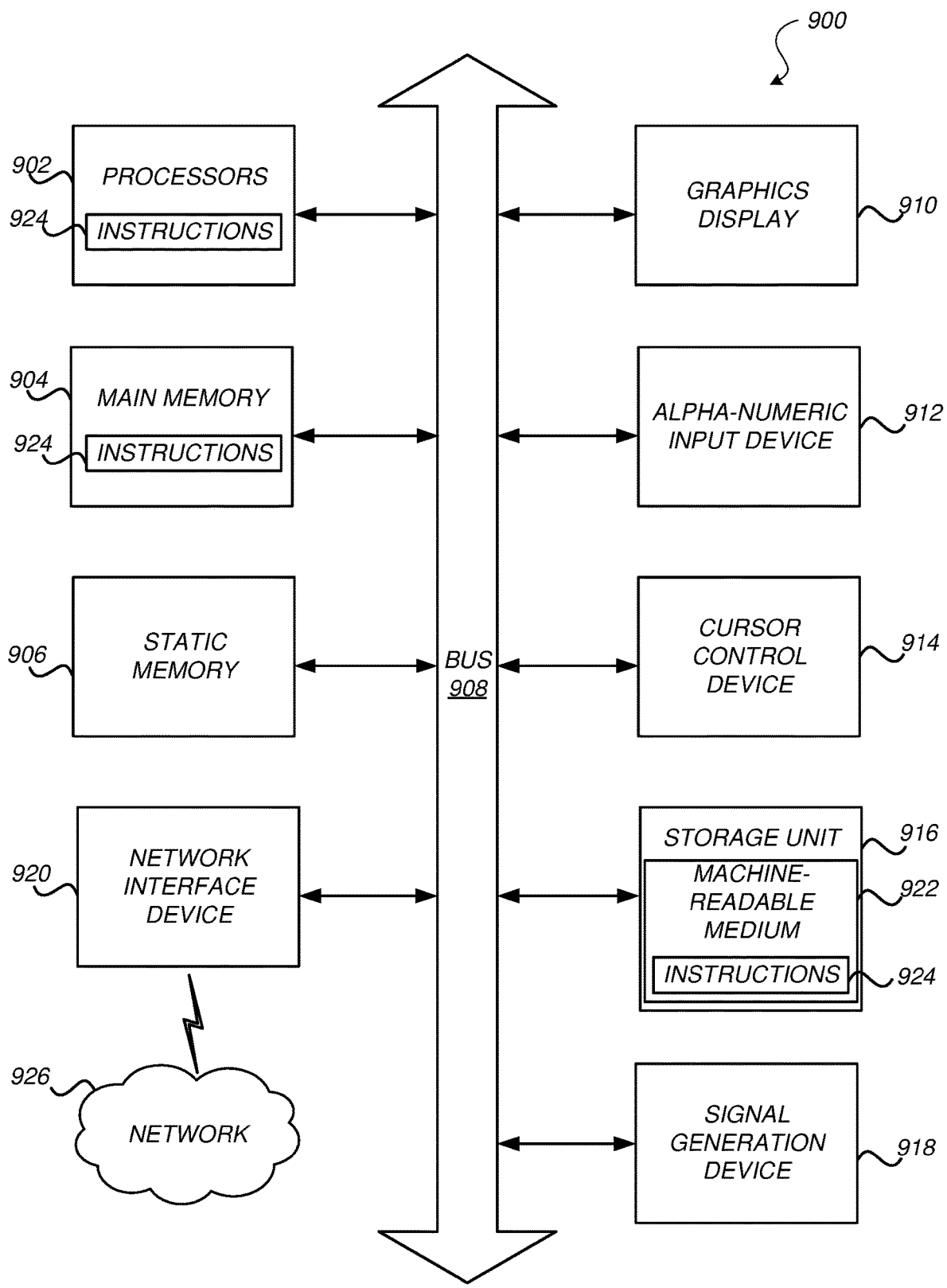
FIG. 9 is a block diagram illustrating components of an example computing machine, in accordance with some embodiments.

FIG. 9 is a block diagram illustrating components of an example computing machine that is capable of reading instructions from a computer-readable medium and execute them in a processor (or controller). A computer described herein may include a single computing machine shown in FIG. 9, a virtual machine, a distributed computing system that includes multiples nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, source code, program code, bytecode, or machine code), which may be stored in a computer-readable medium for causing the machine to perform any one or more of the processes discussed herein may be executed. In some embodiments, the computing machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the message management server 110, the client server 125, the user computing device 132 and various engines, interfaces, terminals, and machines shown in FIG. 2. While FIG. 9 shows various hardware and software elements, each of the components described in FIG. 1 or FIG. 2 may include additional or fewer elements. Further, the instructions may correspond to the functionality of components and interfaces described with FIGS. 1-8.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 900 may also include a memory 904 that store computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders.

Instructions may be used in a general sense and are not limited to machine-readable codes.

One and more methods described herein improve the operation speed of the processors 902 and reduces the space required for the memory 904. For example, the methods described herein reduce the complexity of the computation of the processors 902 by applying one or more novel techniques that simplify the steps in training, reaching convergence, and generating results of the processors 902. The algorithms described herein also reduces the size of the models and datasets to reduce the storage space requirement for memory 704.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 700 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processors 902, displays a GUI (GUI) to display one or more results and data generated by the processes described herein. The computer system 900 may also include an alphanumeric input device 912 (e.g., a keyboard), a cursor control device 914 (e.g., a mouse, a trackball, a joystick, a motion sensor, or another pointing instrument), a storage unit 916 (a hard drive, a solid state drive, a hybrid drive, a memory disk, etc.), a signal generation device 918 (e.g., a speaker), and a network interface device 920, which also are configured to communicate via the bus 708.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Example Embodiments

In some aspects, the techniques described herein relate to a computer-implemented method, including: receiving, from a software development kit (SDK) by a message management server, a channel identifier that represents an in-application communication channel of a software application that imports the SDK as part of the software application, the software application developed by a message publisher, and the SDK developed by the message management server; associating the channel identifier with an end user identifier of an end user; receiving, from the message publisher via a graphical user interface, configuration data describing an in-application user interface (UI) element for display by the software application, the configuration data including a trigger condition for displaying the in-application UI element; transmitting a message to the SDK via the in-application communication channel, wherein the message includes the trigger condition from the configuration data for the in-application UI element; responsive to the SDK determining that the trigger condition is satisfied, providing additional configuration data from the configuration data for the in-application UI element to the SDK, wherein the SDK uses the additional configuration data to render the in-application UI element for display in the software application; receiving a response from the SDK, the response corresponding to an interaction with the rendered in-application UI element by the end user in the software application and forwarded to the SDK; and performing, by the message management server, an action based on the response.

In some aspects, the techniques described herein relate to a computer-implemented method, including: receiving, from a software development kit (SDK) by a message management server, a channel identifier that represents an in-application communication channel of a software application that imports the SDK as part of the software application, the software application developed by a message publisher, and the SDK developed by the message management server; associating the channel identifier with an end user identifier of an end user; receiving, from the message publisher via a graphical user interface, configuration data describing an in-application preference center user interface (UI) for display by the software application; transmitting a message to the SDK via the in-application communication channel, wherein the message includes configuration data for the in-application preference center UI; responsive to the SDK receiving a request to display the in-application preference center UI, providing preference state data corresponding the end user to the SDK, wherein the SDK uses the preference state data to render the in-application preference center UI for display in the software application; receiving a response from the SDK, the response corresponding to an interaction with the rendered in-application preference center UI element by the end user in the software application and forwarded to the SDK, the response indicating an update to the preference state data; and updating, by the message management server, the preference state data based on the update indicated by the response.

In some aspects, the techniques described herein relate to a system including: a software development kit (SDK) included in a software application, the software application importing the SDK as part of the software application, the software application developed by a message publisher; a graphical user interface configured to allow the message publisher to provide, at the graphical user interface, configuration data describing in-application user interface (UI) elements for display by the software application; and a message management server in communication with the SDK and the graphical user interface, the message management server including one or more processors and memory configured to store computer code including instructions, the instructions, when executed by the one or more processors, cause the one or more processors to: receive, from the SDK, a channel identifier that represents an in-application communication channel of the software application; associate the channel identifier with an end user identifier of an end user; receive, from the message publisher via the a graphical user interface, configuration data describing an in-application user interface (UI) element for display by the software application, the configuration data including a trigger condition for displaying the in-application UI element; transmit a message to the SDK via the in-application communication channel, wherein the message includes the trigger condition from the configuration data for the in-application UI element; responsive to the SDK determining that the trigger condition is satisfied, provide additional configuration data from the configuration data for the in-application UI element to the SDK, wherein the SDK uses the additional configuration data to render the in-application UI element for display in the software application; receive a response from the SDK, the response corresponding to an interaction with the rendered in-application UI element by the end user in the software application and forwarded to the SDK; and performing, by the message management server, an action based on the response.

In some aspects, the techniques described herein relate to a system including: a software development kit (SDK) included in a software application, the software application importing the SDK as part of the software application, the software application developed by a message publisher; a graphical user interface configured to allow the message publisher to provide, at the graphical user interface, configuration data describing in-application preference center user interfaces (UIs) for display by the software application; and a message management server in communication with the SDK and the graphical user interface, the message management server including one or more processors and memory configured to store computer code including instructions, the instructions, when executed by the one or more processors, cause the one or more processors to: receive, from the SDK, a channel identifier that represents an in-application communication channel of the software application; associate the channel identifier with an end user identifier of an end user; receive, from the message publisher via a graphical user interface, configuration data describing an in-application preference center user interface (UI) for display by the software application; transmit a message to the SDK via the in-application communication channel, wherein the message includes configuration data for the in-application preference center UI; responsive to the SDK receiving a request to display the in-application preference center UI, provide preference state data corresponding the end user to the SDK, wherein the SDK uses the preference state data to render the in-application preference center UI for display in the software application; receive a response from the SDK, the response corresponding to an interaction with the rendered in-application preference center UI element by the end user in the software application and forwarded to the SDK, the response indicating an update to the preference state data; and update, by the message management server, the preference state data based on the update indicated by the response.

ADDITIONAL CONSIDERATIONS

Beneficially, the message management server provides a platform for various message publishers to delegate the task of distributing messages via various channels to the message management server. Transmission of messages through different channels may be technically challenging for many organizations because each channel may have its own requirement, communication protocol, infrastructure with which organizations may not be equipped. By providing a user-friendly user interface to the message publishers for them to build message series, the message management server manages the technical difficulties for the message publishers. The appearance, contents, and overall feeling of the message may be changed significantly when a different channel is used to deliver the message. The graphical user interface may also provide simulations of the messages as rendered in end users' computing devices, thereby providing the message publishers with previews of the messages that could have dramatically different appearances when transmitted via different channels and rendered in different operating systems and models of computing devices. The message management also allows more complex interaction such as two-way messaging to be implemented. The use of SDK allows the message management server to automatically implement messaging and response features across different applications that are developed by different parties.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A computer-implemented method, comprising:
   receiving a design of an in-application user interface overlay (in-app UI overlay) generated by a message publisher via a graphical user interface provided by a message management server, wherein the graphical user interface provided by the message management server simulates an appearance of the in-app UI overlay that augments a software application, the software application developed by the message publisher;
   converting the design of the in-app UI overlay as a message payload that includes configuration data of the in-app UI overlay, the message payload in a compatible format associated with the software application;
   receiving, from a software development kit (SDK) associated with the message management server, a channel identifier that represents an in-application communication channel of the software application that imports the SDK as part of the software application, and the SDK developed by the message management server;
   associating the channel identifier with an end user identifier of an end user;
   receiving, from the message publisher, a trigger condition for displaying the in-app UI overlay;
   receiving, from the SDK a mobile event notification related to the software application;
   determining that the mobile event notification matches the trigger condition;
   generating, responsive to the trigger condition being met, the message payload that includes the configuration data of the in-app UI overlay; and
   transmitting the message payload to the SDK, wherein the SDK uses the configuration data to render the in-app UI overlay, wherein the in-app UI overlay covers at least a portion of the software application.

2. The computer-implemented method of claim 1, wherein the configuration data is received from the message publisher through a portal provided by the message management server, and the graphical user interface is part of the portal.

3. The computer-implemented method of claim 1, further comprising:
   receiving a response from the SDK, the response corresponding to an interaction with the rendered in-app UI overlay by the end user in the software application and forwarded to the SDK.

4. The computer-implemented method of claim 3, further comprising performing, by the message management server, an action based on the response.

5. The computer-implemented method of claim 1, wherein the trigger condition is a mobile event.

6. A system comprising:
   a software development kit (SDK) included in a software application, the software application importing the SDK as part of the software application, the software application developed by a message publisher; and
   a message management server in communication with the SDK, the SDK developed by the message management server, the message management server comprising one or more processors and memory configured to store computer code comprising instructions, the instructions, when executed by the one or more processors, cause the one or more processors to:
   receive a design of an in-application user interface overlay (in-app UI overlay) generated by the message publisher via a graphical user interface provided by the message management server, wherein the graphical user interface provided by the message management server simulates an appearance of the in-app UI overlay that augments the software application;
   convert the design of the in-app UI overlay as a message payload that includes configuration data of the in-app UI overlay, the message payload in a compatible format associated with the software application;
   receive, from the SDK, a channel identifier that represents an in-application communication channel of the software application;
   associate the channel identifier with an end user identifier of an end user;
   receive, from the message publisher, a trigger condition for displaying the in-app UI overlay; and receive, from the SDK a mobile event notification related to the software application;
determine that the mobile event notification matches the trigger condition;
generate, responsive to the trigger condition being met, the message payload that includes the configuration data of the in-app UI overlay; and
transmit the message payload to the SDK, wherein the SDK uses the configuration data to render the in-app UI overlay, wherein the in-app UI overlay covers at least a portion of the software application.

7. The system of claim 6, further comprising a portal configured to allow the message publisher to provide the configuration data.

8. The system of claim 6, wherein the instructions, when executed, further cause the one or more processors to:
receive a response from the SDK, the response corresponding to an interaction with the rendered in-app UI overlay by the end user in the software application and forwarded to the SDK.

9. The system of claim 8, wherein the instructions, when executed, further cause the one or more processors to perform an action based on the response.

10. The system of claim 6, wherein the trigger condition is a mobile event.

11. A computer-implemented method, comprising:
receiving a design of an in-application preference center user interface (UI) generated by a message publisher via a graphical user interface provided by a message management server, wherein the graphical user interface provided by the message management server simulates an appearance of the in-application preference center UI that augments a software application, the software application developed by the message publisher;
converting the design of the in-application preference center UI as a message payload that includes configuration data of the in-application preference center UI, the message payload in a compatible format associated with the software application;
receiving, from a software development kit (SDK) associated with the message management server, a channel identifier that represents an in-application communication channel of the software application that imports the SDK as part of the software application, and the SDK developed by the message management server;
associating the channel identifier with an end user identifier of an end user;
receiving, from the message publisher, a trigger condition for displaying the in-application preference center UI;
receiving, from the SDK a mobile event notification related to the software application;
determining that the mobile event notification matches the trigger condition;
generating, responsive to the trigger condition being met, the message payload that includes the configuration data of the in-application preference center UI; and
transmitting the message payload to the SDK, wherein the SDK uses the configuration data to render the in-application preference center UI, the in-application preference center UI is configured to collect preference state data corresponding the end user, wherein the software application is configured to be adjusted based on the preference state data.

12. The computer-implemented method of claim 11, wherein the configuration data is received from the message publisher through a portal provided by the message management server, and the graphical user interface is part of the portal.

13. The computer-implemented method of claim 11, further comprising:
receiving a response from the SDK, the response corresponding to an interaction with the rendered in-application preference center UI by the end user in the software application and forwarded to the SDK, the response indicating an update to the preference state data.

14. The computer-implemented method of claim 13, further comprising updating, by the message management server, the preference state data based on the update indicated by the response.

15. The computer-implemented method of claim 11, wherein the preference state data is related to a mobile event.

16. A system comprising:
a software development kit (SDK) included in a software application, the software application importing the SDK as part of the software application, the software application developed by a message publisher; and
a message management server in communication with the SDK, the SDK developed by the message management server, the message management server comprising one or more processors and memory configured to store computer code comprising instructions, the instructions, when executed by the one or more processors, cause the one or more processors to:
receive a design of an in-application preference center user interface (UI) generated by the message publisher via a graphical user interface provided by the message management server, wherein the graphical user interface provided by the message management server simulates an appearance of the in-application preference center UI that augments a software application, the software application developed by the message publisher;
convert the design of the in-application preference center UI as a message payload that includes configuration data of the in-application preference center UI, the message payload in a compatible format associated with the software application;
receive, from the SDK, a channel identifier that represents an in-application communication channel of the software application that imports the SDK as part of the software application, and the SDK developed by the message management server;
associate the channel identifier with an end user identifier of an end user;
receive, from the message publisher, a trigger condition for displaying the in-application preference center UI;
receive, from the SDK a mobile event notification related to the software application;
determine that the mobile event notification matches the trigger condition;
generate, responsive to the trigger condition being met, the message payload that includes the configuration data of the in-application preference center UI; and
transmit the message payload to the SDK, wherein the SDK uses the configuration data to render the in-application preference center UI, the in-application preference center UI is configured to collect preference state data corresponding the end user, wherein the software application is configured to be adjusted based on the preference state data.

17. The system of claim 16, further comprising a portal configured to allow the message publisher to provide the configuration data.

18. The system of claim 16, wherein the instructions, when executed, further cause the one or more processors to:
- receive a response from the SDK, the response corresponding to an interaction with the rendered in-application preference center UI by the end user in the software application and forwarded to the SDK, the response indicating an update to the preference state data.

19. The system of claim 18, wherein the instructions, when executed, further cause the one or more processors to update the preference state data based on the update indicated by the response.

20. The system of claim 16, wherein the preference state data is related to a mobile event.

* * * * *